(12) United States Patent
Morimoto et al.

(10) Patent No.: US 9,534,816 B2
(45) Date of Patent: Jan. 3, 2017

(54) THERMO-MAGNETIC CYCLE APPARATUS WITH BYPASS VALVE

(75) Inventors: Tsuyoshi Morimoto, Obu (JP); Naoki Watanabe, Kariya (JP); Shinichi Yatsuzuka, Nagoya (JP); Kazutoshi Nishizawa, Toyoake (JP); Takuya Fuse, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 979 days.

(21) Appl. No.: 13/467,542

(22) Filed: May 9, 2012

(65) Prior Publication Data

US 2012/0285179 A1  Nov. 15, 2012

(30) Foreign Application Priority Data

May 13, 2011 (JP) .................................. 2011-108504
Jan. 26, 2012 (JP) .................................. 2012-014271

(51) Int. Cl.
F25B 21/00 (2006.01)
F25B 41/04 (2006.01)

(52) U.S. Cl.
CPC ............... *F25B 21/00* (2013.01); *F25B 41/04* (2013.01); *Y02B 30/66* (2013.01)

(58) Field of Classification Search
CPC . F25B 21/00; F25B 2321/0021; F25B 47/022; F25B 13/00; F25B 2321/0022; Y02B 30/66; F01M 5/007; F28F 27/02
USPC ........................................... 62/3.1, 3.3, 467
See application file for complete search history.

(56) References Cited

U.S. PATENT DOCUMENTS

| | | | | |
|---|---|---|---|---|
| 3,176,759 | A | * | 4/1965 | Windham ................... 165/220 |
| 5,857,661 | A | * | 1/1999 | Amada .................. F16K 7/075 |
| | | | | 137/467.5 |
| 6,598,404 | B2 | * | 7/2003 | Kruip ................... G05D 23/275 |
| | | | | 62/210 |
| 2008/0083245 | A1 | * | 4/2008 | Ghoshal et al. ............... 62/467 |
| 2008/0314048 | A1 | * | 12/2008 | Barve et al. .................... 62/3.1 |
| 2009/0217675 | A1 | * | 9/2009 | Kobayashi et al. ............. 62/3.1 |

(Continued)

FOREIGN PATENT DOCUMENTS

EP          2108904 A1 * 10/2009
JP          60-008672          1/1985

(Continued)

OTHER PUBLICATIONS

International Journal of Refrigeration 29 (2006) pp. 1327-1331 (T. Okumara et al.).*

(Continued)

*Primary Examiner* — Davis Hwu
*Assistant Examiner* — Gordon Jones
(74) *Attorney, Agent, or Firm* — Harness, Dickey & Pierce, P.L.C.

(57) ABSTRACT

A thermo-magnetic cycle apparatus includes: a magnetic element having a Curie temperature distribution in a distribution direction. A magnetic-field supplier supplies an external magnetic field to the magnetic element. A pump pumps heat transport medium to flow forward and backward in the distribution direction. The heat transport medium transports heat of the magnetic element. A shift device causes a position of a high temperature end and/or a low temperature end of the magnetic element to move.

16 Claims, 20 Drawing Sheets

(56) References Cited

U.S. PATENT DOCUMENTS

2010/0095686 A1* 4/2010 Cramet ............... F25B 21/00
                                                    62/3.1
2011/0104530 A1    5/2011 Muller et al.
2011/0173993 A1    7/2011 Muller et al.
2011/0215088 A1    9/2011 Muller et al.

FOREIGN PATENT DOCUMENTS

| | | |
|---|---|---|
| JP | 2002-281774 | 9/2002 |
| JP | B2-4234235 | 3/2009 |
| JP | 2009-210165 | 9/2009 |
| JP | 2009-281685 | 12/2009 |
| WO | WO 2012/102016 | 8/2012 |

OTHER PUBLICATIONS

Office action dated Feb. 8, 2014 in corresponding Chinese Application No. 2012 10140291.5.
Office action dated Apr. 16, 2013 in corresponding Japanese Application No. 2012-014271.
Office action dated Jun. 25, 2013 in corresponding Japanese Application No. 2012-014271.
Office Action dated Sep. 11, 2014 in corresponding Chinese Application No. 201210140291.5.

* cited by examiner

THERMO-MAGNETIC CYCLE APPARATUS WITH BYPASS VALVE

CROSS REFERENCE TO RELATED APPLICATION

This application is based on Japanese Patent Application No. 2011-108504 filed on May 13, 2011 and Japanese Patent Application No. 2012-14271 filed on Jan. 26, 2012, the disclosures of which are incorporated herein by reference in their entirety.

TECHNICAL FIELD

The present disclosure relates to a thermo-magnetic cycle apparatus.

BACKGROUND

FR 2933539 and FR 2936363 describe a magneto-caloric effect type heat pump apparatus applied to a vehicle as a thermo-magnetic cycle apparatus that uses temperature characteristics of a magnetic element. FR 2933539 has the corresponding publications WO 2010/004131 and US 2011/0104530. FR 2936363 has the corresponding publications WO 2010/061064 and US 2011/0215088.

FR 2936364 describes a structure of a magneto-caloric element, and has the corresponding publications WO 2010/034907 and US 2011/0173993. The magneto-caloric element has plural element units respectively have Curie temperatures different from each other, and the plural element units are arranged in order of the Curie temperature.

JP-B2-4234235 and JP-A-2002-281774 describe a thermo-magnetic engine as a thermo-magnetic cycle apparatus that uses temperature characteristics of a magnetic element.

The magneto-caloric element of FR 2936364 has the distribution in the Curie temperature, and the distribution corresponds to a temperature distribution generated between a high temperature end and a low temperature end of the element. In this case, high magneto-caloric effect can be achieved by the magneto-caloric element.

However, if the temperature of the high temperature end or the low temperature end is varied, the magneto-caloric effect is lowered. For example, in the magneto-caloric effect type heat pump apparatus, a temperature of a heat source and a temperature of a thermal load easily vary. More specifically, in a case where the magneto-caloric effect type heat pump apparatus is used in an air-conditioner, outside air temperature and inside air temperature vary. If the temperature of the high temperature end or the low temperature end is varied, the magneto-caloric element cannot work in an optimal temperature range, so that performance of the magneto-caloric effect type heat pump apparatus including the magneto-caloric element may be lowered.

SUMMARY

It is an object of the present disclosure to provide a thermo-magnetic cycle apparatus in which a magnetic element works efficiently.

According to an example of the present disclosure, a thermo-magnetic cycle apparatus includes a magnetic element, a magnetic-field supplier, a pump and a shift device. The magnetic element has a Curie temperature distribution between a high temperature end and a low temperature end in a distribution direction. The magnetic-field supplier supplies an external magnetic field to the magnetic element. The pump pumps heat transport medium to go and return in the distribution direction. The heat transport medium transports heat of the magnetic element. The shift device causes a position of the high temperature end and/or the low temperature end to move.

Accordingly, the magnetic element works efficiently even when a temperature variation is generated in the magnetic element.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
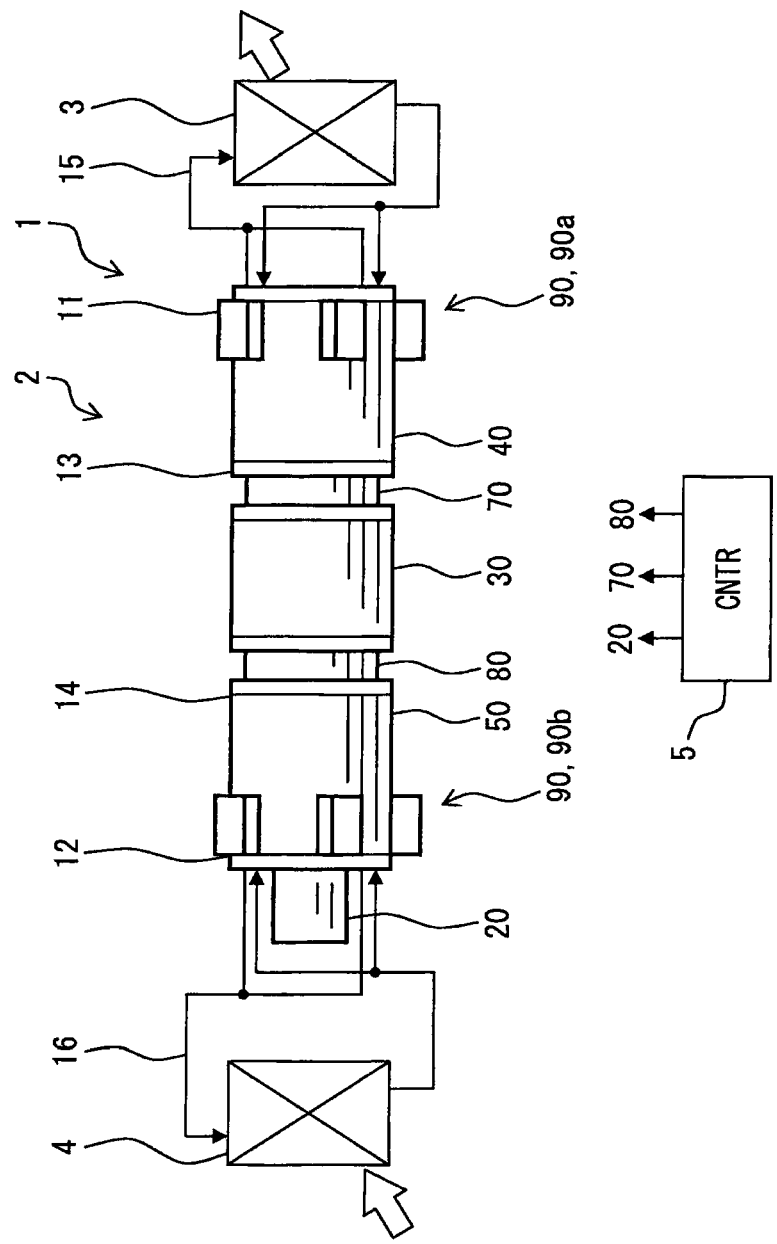
FIG. 1 is a schematic view illustrating an air-conditioner including a magneto-caloric effect heat pump apparatus according to a first embodiment.

Embodiments of the present invention will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The correspondence in the embodiments is indicated by providing reference numerals in which only the hundred place is made different. The parts may be combined even if it is not explicitly described that the parts can be combined. The embodiments may be partially combined even if it is not explicitly described that the embodiments can be combined, provided there is no harm in the combination.

First Embodiment

As shown in FIG. 1, a magneto-caloric effect heat pump (MHP) apparatus 2 according to a first embodiment is applied to an air-conditioner 1 of a vehicle, and is referred as MHP apparatus 2 hereinafter. The air-conditioner 1 conditions a temperature of air in a passenger compartment of the vehicle. The air-conditioner 1 has an indoor heat exchanger 3 arranged in the passenger compartment, and heat is exchanged in the indoor heat exchanger 3 with inside air. The indoor heat exchanger 3 may correspond to a high-temperature heat exchanger. The air-conditioner 1 further has an outdoor heat exchanger 4 arranged outside of the passenger compartment, and heat is exchanged in the outdoor heat exchanger 4 with outside air. The outdoor heat exchanger 4 may correspond to a low-temperature heat exchanger.

Temperature of the high-temperature heat exchanger 3 is higher than that of the low-temperature heat exchanger 4. Temperature of the low-temperature heat exchanger 4 is lower than that of the high-temperature heat exchanger 3. The air-conditioner 1 has equipments such as air-conditioning duct and blower, and uses the heat exchanger 3 and/or the heat exchanger 4 for the air-conditioning of the passenger compartment.

The air-conditioner 1 conducts a cooling operation as a cooling device, or a heating operation as a heating device. The air-conditioner 1 has a cooler that cools air to be supplied to the passenger compartment, and a heater that heats the cooled air. The MHP apparatus 2 is a supply source that supplies cold energy or hot energy to the air-conditioner 1. That is, the high-temperature heat exchanger 3 may be used as the heater, and the low-temperature heat exchanger 4 may be used as the cooler.

When the MHP apparatus 2 is used as the supply source of the hot energy, air passing through the high-temperature heat exchanger 3 is supplied to the passenger compartment for the heating operation. At this time, air passing through the low-temperature heat exchanger 4 is discharged out of the passenger compartment.

When the MHP apparatus 2 is used as the supply source of the cold energy, air passing through the low-temperature heat exchanger 4 is supplied to the passenger compartment for the cooling operation. At this time, air passing through the high-temperature heat exchanger 3 is discharge out of the passenger compartment.

When the MHP apparatus 2 is used as a dehumidification device, air passing through the low-temperature heat exchanger 4 is further made to pass through the high-temperature heat exchanger 3, and is supplied to the passenger compartment. The MHP apparatus 2 is used as the supply source of the hot energy in both of winter season and summer season.

The air-conditioner 1 includes the MHP apparatus 2 that uses magneto-caloric effect of a magneto-caloric effect (MCE) element. Hereinafter, the magneto-caloric effect element may be referred as MCE element. The MHP apparatus 2 corresponds to a thermo-magnetic cycle apparatus.

In this specification, the word of the heat pump apparatus is used in a broad sense. That is, the word of the heat pump apparatus includes both of a heat pump apparatus using cold energy and a heat pump apparatus using hot energy. The heat pump apparatus using cold energy may correspond to a refrigerating cycle apparatus. The word of the heat pump apparatus may be used as a concept that includes the refrigerating cycle apparatus.

As shown in FIG. 1, the MHP apparatus 2 includes a motor 20, a pump 30, a first magneto-caloric element unit 40, a second magneto-caloric element unit 50, a first shift 70, a second shift 80, and a shift device 90 also known as a bypass device. The motor 20 corresponds to a power source. The pump 30 makes heat transport medium to flow. The first magneto-caloric element unit 40 accommodates a magneto-caloric element. The second magneto-caloric element unit 50 accommodates a magneto-caloric element. The magneto-caloric element generates heat when an external magnetic field is applied to the element, and absorbs heat when the external magnetic field is removed from the element. Hereinafter, the magneto-caloric element unit 40, 50 may be referred as MCD unit 40, 50.

The MHP apparatus 2 supplies hot energy to a high temperature end 11, and supplies cold energy to a low temperature end 12. When the MHP apparatus 2 is operated, the temperature of the magneto-caloric element of the MHP apparatus 2 becomes high at the high temperature end 11, and becomes low at the low temperature end 12. The cold energy and the hot energy supplied by the MHP apparatus 2 are transported by heat transport medium. The heat transport medium may be water, for example. Hereinafter, the heat transport medium of the MHP apparatus 2 is referred as working water.

High-temperature working water flows out of the high-temperature end 11, and the hot energy is supplied to outside. After the hot energy is supplied to outside, the working water returns to the high temperature end 11. At this time, cold energy is carried into the high temperature end 11.

Low-temperature working water flows out of the low temperature end 12, and the cold energy is supplied to outside. After the cold energy is supplied to outside, the working water returns to the low temperature end 12. At this time, hot energy is carried into the low temperature end 12.

The MHP apparatus 2 is equipped with the plural MCD units 40, 50 in this embodiment. The first MCD unit 40 located on the high temperature side supplies the cold energy to a middle low temperature end 13 that is located at approximately middle between the high temperature end 11 and the low temperature end 12. The second MCD unit 50 located on the low temperature side supplies the hot energy to a middle high temperature end 14 that is located at approximately middle between the high temperature end 11 and the low temperature end 12.

The first shift 70, the second shift 80, the pump 30 and the heat transport medium existing in the shift 70, 80 and the pump 30 are thermally combined with each other, between the middle low temperature end 13 and the middle high temperature end 14. Sufficient thermal binding is provided between the middle low temperature end 13 and the middle high temperature end 14 so as to form a predetermined temperature gradient between the high temperature end 11 and the low temperature end 12.

The air-conditioner 1 has a high temperature side circulation passage 15 that connects the MHP apparatus 2 to the indoor heat exchanger 3. Working water flowing through the high temperature passage 15 transmits heat to the indoor heat exchanger 3 from the MHP apparatus 2.

The air-conditioner 1 has a low temperature side circulation passage 16 that connects the MHP apparatus 2 to the outdoor heat exchanger 4. Working water flowing through the low temperature passage 16 transmits heat from the outdoor heat exchanger 4 to the MHP apparatus 2.

The air-conditioner 1 uses outside air as a main heat source. A thermal load of the air-conditioner 1 corresponds to inside air. In this case, the air-conditioner 1 corresponds to a heating device. The MHP apparatus 2 supplies the heat of the outdoor heat exchanger 4 corresponding to the main heat source to the indoor heat exchanger 3 corresponding to the thermal load.

The MHP apparatus 2 has the shift device 90 that causes a position of the high temperature end 11 and/or the low temperature end 12 to move. The high temperature end 11 and the low temperature end 12 are located on ends of a magnetic element corresponding to the magneto-caloric element. The shift device 90 may be referred as an invalidation device that invalidates a predetermined part of the magneto-caloric element. The shift device 90 invalidates only the predetermined part that is located at or around the high temperature end 11 and/or the low temperature end 12.

The shift device 90 has a passage controller 90a, 90b that controls a flow of the working water. The passage controller 90a is located on the high temperature side, and the passage controller 90b is located on the low temperature side. The passage controller 90a, 90b controls a state of the heat transport conducted by the working water. Specifically, the passage controller 90a, 90b switches the state of the heat transport between a first state where all the heat of the magneto-caloric element including the predetermined part is transported and a second state where the heat of the predetermined part is prohibited from being transported. In the second state, heat of the other part of the magneto-caloric element is transported, other than the predetermined part.

The working water is made to flow in a manner that the heat of the predetermined part is transported in the first state. In the second state, the working water is made to flow by bypassing the predetermined part, so that the heat of the predetermined part is not transported in the second state.

Figure 2:
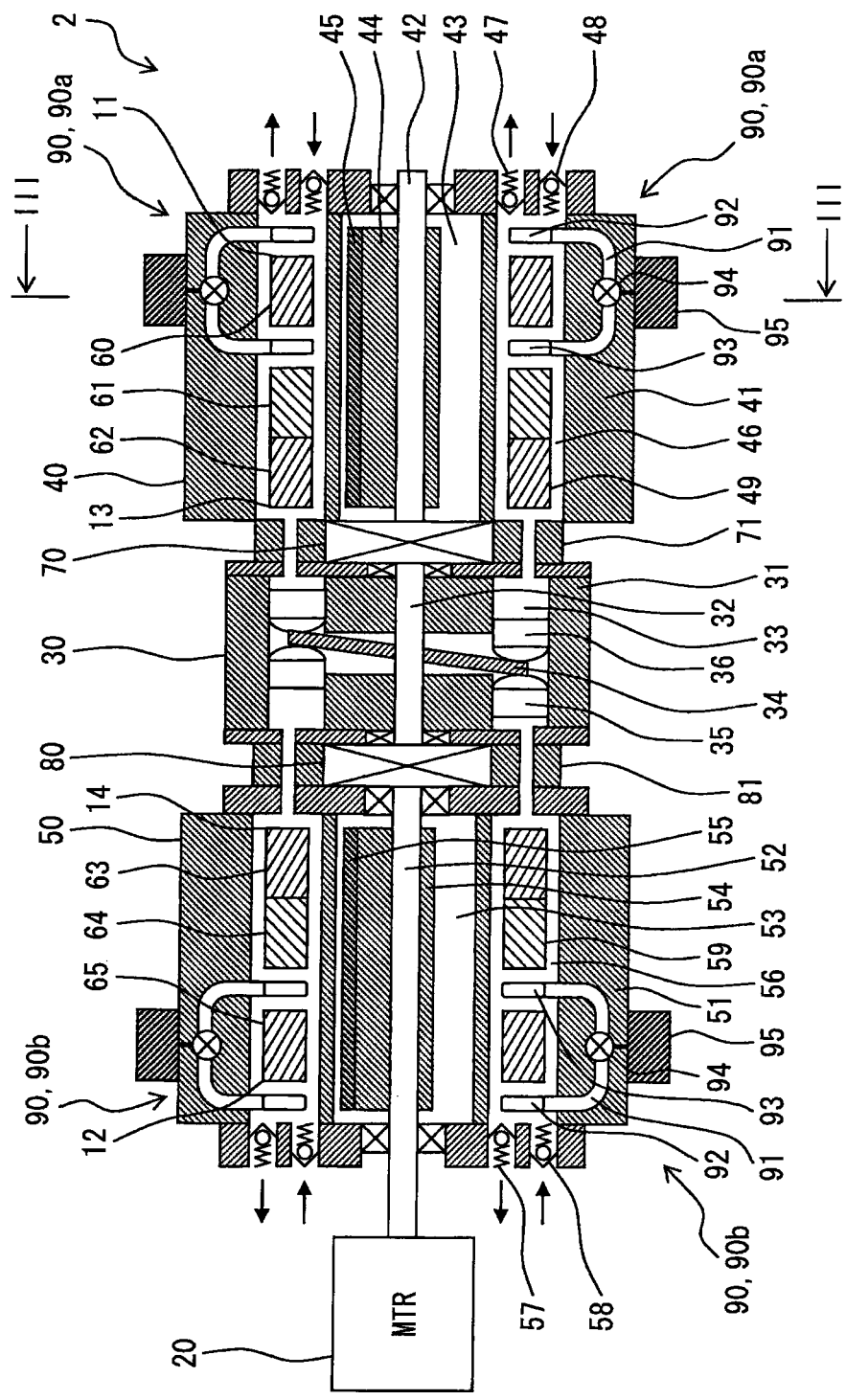
FIG. 2 is a sectional view illustrating the magneto-caloric effect heat pump apparatus of the first embodiment.

As shown in FIG. 2, the passage controller 90a, 90b defines a bypass passage 91 through which the working water flows to bypass the predetermined part. The passage controller 90a, 90b has a valve device 94 which selectively switches the working water to flow through the bypass passage 91 or a main passage including the predetermined part. The shift device 90 causes the position of the high temperature end 11 and/or the low temperature end 12 to move, thereby changing a valid area of the magnetic element where the magnetic element becomes effective.

Figure 3:
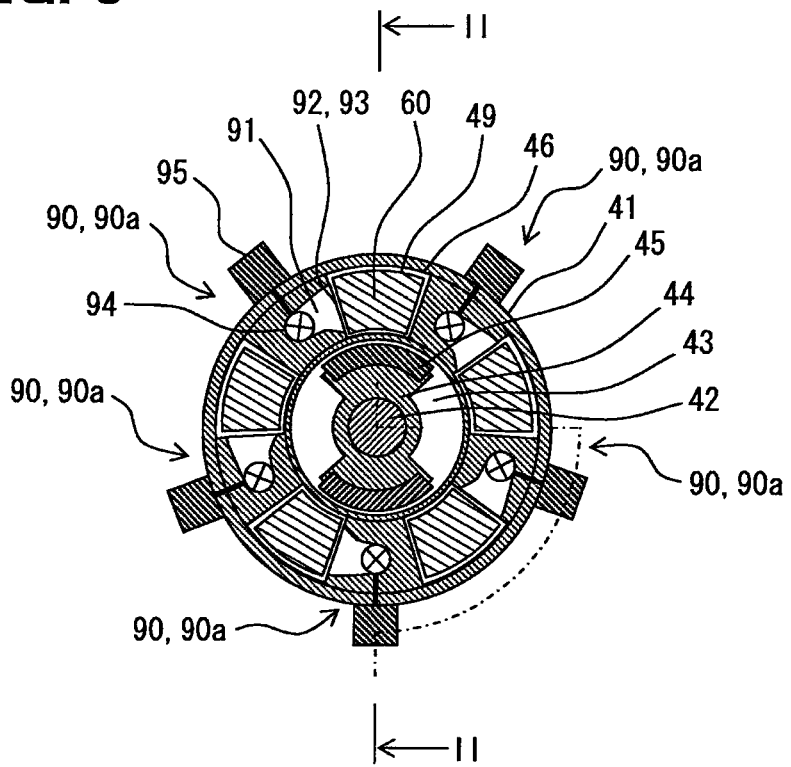
FIG. 3 is a sectional view taken along a line III-III of FIG. 2.

FIG. 2 is a schematic sectional view of the MHP apparatus 2 of the first embodiment, which is taken along a line II-II of FIG. 3. FIG. 3 is a schematic sectional view of the MHP apparatus 2 of the first embodiment, which is taken along a line III-III of FIG. 2.

The motor (MTR) 20 is provided as the power source of the MHP apparatus 2, and is driven by an in-vehicle battery. The motor 20 drives the pump 30. Thereby, the motor 20 and the pump 30 generate a flow of the working water. Moreover, the motor 20 rotates a permanent magnet of the MCD unit 40, 50. Thereby, the motor 20 and the MCD unit 40, 50 alternately switch a state of external magnetic field. That is, the external magnetic field is applied to the magneto-caloric element or is removed from the magneto-caloric element, and the switching is alternately performed by the motor 20 and the MCD unit 40, 50. The removal of the external magnetic field represents that no external magnetic field is applied to the magneto-caloric element.

The pump 30 generates two-direction flows of the working water in the MCD unit 40, 50, and the magneto-caloric element works as an active magnetic refrigeration (AMR) cycle. Further, the pump 30 produces a circulation flow of the working water for supplying the cold energy and/or the hot energy obtained from the MCD unit 40, 50 to outside.

The circulation flow represents a flow of working water flowing out of the MCD unit 40, 50 and again returning to the MCD unit 40, 50. The circulation flow may include a high temperature external circulation flow of the working water that flows out of the high temperature end 11, passes through the high temperature side circulation passage 15, and returns to the high temperature end 11 again. The circulation flow may include a low temperature external circulation flow of the working water that flows out of the low temperature end 12, passes through the low temperature side circulation passage 16, and returns to the low temperature end 12 again. In this embodiment, the pump 30 generates both of the low temperature external circulation flow and the high temperature external circulation flow.

The pump 30 is a positive-displacement two-direction pump, and a cam (swash) plate type piston pump. As shown in FIG. 2, the pump 30 has a cylindrical housing 31. The housing 31 supports a revolving shaft 32 rotatably at the center axis. The housing 31 partitions and defines at least one cylinder 33. For example, plural cylinders 33 are arranged around the revolving shaft 32 at equal intervals in a circumference direction. In this embodiment, the housing 31 partitions and defines, for example, five cylinders 33.

The housing 31 accommodates a cam (swash) plate 34. The cam plate 34 is rotatably supported in the inclined state, that is, a predetermined angle is defined between the cam plate 34 and the center axis of the housing 31. The cam plate 34 is connected with the revolving shaft 32 and rotates with the revolving shaft 32. Two pistons 35 and 36 are arranged in the respective cylinder 33. The cam plate 34 is located between the two pistons 35 and 36.

One of the pistons 35 reciprocates in the right half of the cylinder 33, in FIG. 2. The other piston 36 reciprocates in the left half of the cylinder 33, in FIG. 2. As a result, two-cylinder positive-displacement piston pump is defined in the respective cylinder 33. Volumes of the two-cylinder are complementarily fluctuated. The two-cylinder simultaneously generates a flow flowing from the low temperature end 12 to the middle high temperature end 14 and a flow flowing from the middle low temperature end 13 to the high temperature end 11. Moreover, the two-cylinder simultaneously generates a flow flowing to the middle low temperature end 13 from the high temperature end 11 and a flow flowing to the low temperature end 12 from the middle high temperature end 14.

Because the housing 31 defines the five cylinders 33, the pump 30 is a ten-cylinder piston pump. At another viewpoint, the two pistons 35, 36 oppose to each other through the cam plate 34, so that the pump 30 provides a first pump group located on the right side and a second pump group located on the left side, in FIG. 2. The first pump group is used for the first MCD unit 40. The second pump group is used for the second MCD unit 50.

The first MCD unit 40 and the second MCD unit 50 are located opposite from each other through the pump 30, and are symmetrically constructed and arranged relative to the pump 30. The first MCD unit 40 and the second MCD unit 50 construct one magneto-caloric device unit, as a whole, which supplies hot energy to the high temperature end 11 and supplies cold energy to the low temperature end 12.

The MCD unit 40, 50 has a cylindrical housing 41, 51. The housing 41, 51 supports a revolving shaft 42, 52 rotatably at the center axis. The housing 41, 51 partitions and defines a cylindrical magnet chamber 43, 53 around the revolving shaft 42, 52, as shown in FIG. 3. A rotor core 44, 54 is fixed to the revolving shaft 42, 52, and is constructed to define two kinds of areas in the circumference direction. A flux of magnetic induction easily passes in one of the areas, and is difficult to pass in the other area.

The cross-section of the rotor core 44, 54 has at least one sector (fan) shaped portion. In this embodiment, the rotor core 44, 54 has two sector shaped portions. A permanent magnet 45, 55 is fixed to the rotor core 44, 54. The permanent magnet 45, 55 has a cylindrical surface, and the cross-section of the magnet 45, 55 has a sector (fan) shape, as shown in FIG. 3. The permanent magnet 45, 55 is fixed to the outer cylindrical surface of the sector-shaped portion of the rotor core 44, 54.

The rotor core 44, 54 and the permanent magnet 45, 55 define two kinds of areas in the circumference direction. The external magnetic field provided by the permanent magnet 45, 55 is strong in one of the areas, and the external magnetic field provided by the permanent magnet 45, 55 is weak in the other area. Almost all of the external magnetic field is removed in the other area.

The rotor core 44, 54 and the permanent magnet 45, 55 rotate synchronizing with the rotation of the revolving shaft 42, 52, so that the area where the external magnetic field is strong and the area where the external magnetic field is weak rotate synchronizing with the rotation of the revolving shaft 42, 52. As a result, at one point around the rotor core 44, 54 and the permanent magnet 45, 55, a time period during which the external magnetic field is impressed strongly and a time period during which the external magnetic field becomes weak are repeatedly generated. That is, the rotor core 44, 54 and the permanent magnet 45, 55 correspond to a magnetic-field applier device.

The rotor core 44, 54 and the permanent magnet 45, 55 alternately repeat the impression and the removal of the external magnetic field, and correspond to a magnetic field switcher which alternately switches the impression and the removal of the external magnetic field relative to a magneto-caloric element 49, 59 corresponding to the magnetic element.

The magnetic field switcher is equipped with the first permanent magnet 45 and the second permanent magnet 55. The first permanent magnet 45 is disposed in the first MCD unit 40, and switches the impression and the removal of the magnetic field relative to the first magneto-caloric element 49 by the rotation. The second permanent magnet 55 is arranged in the second MCD unit 50, and switches the impression and the removal of the magnetic field relative to the second magneto-caloric element 59 by the rotation.

The rotor core 44, 54 and the permanent magnet 45, 55 may also correspond to a magnetic-field supplier that supplies the external magnetic field to the MCE element 49, 59.

The housing 41, 51 partitions and defines at least one work chamber 46, 56. The work chamber 46, 56 is located adjacent to the magnet chamber 43, 53. For example, a plurality of the work chambers 46, 56 are arranged at equal intervals in the circumference direction, and are located on the outer side of the magnet chamber 43, 53 in the radial direction. In this embodiment, the housing 41 partitions and defines, for example, five work chambers 46, and the housing 51 partitions and defines, for example, five work chambers 56.

The respective work chamber 46, 56 defines a pillar-shaped space. A longitudinal direction of the space corresponds to the axis direction of the housing 41, 51. The respective work chamber 46, 56 is defined to correspond to only one cylinder 33. The work chamber 46 and the work chamber 56 are arranged to oppose with each other through the one cylinder 33 in the axis direction.

A first end of the respective work chamber 46 has a first gateway section through which the working water flows inward or outward. As shown in FIG. 2, the first gateway section has an exit through which the working water is supplied to the indoor heat exchanger 3, and an inlet which receives the working water returning from the indoor heat exchanger 3. A check valve 47 is disposed in the exit, and permits only the outward flow of the working water from the work chamber 46. A check valve 48 is disposed in the inlet, and permits only the inward flow of the working water into the work chamber 46. The check valve 47 and the check valve 48 may be made of a lead valve or a ball valve.

A second end of the respective work chamber 46 has a second gateway section which communicates with the pump 30. The second gateway section communicates with only one pump chamber defined by the one cylinder 33 and the one piston 35.

A first end of the respective work chamber 56 has a first gateway section through which the working water flows inward or outward. The first gateway section has an exit through which the working water is supplied to the outdoor heat exchanger 4, and an inlet which receives the working water returning from the outdoor heat exchanger 4. A check valve 57 is disposed in the exit, and permits only the outward flow of the working water from the work chamber 56. A check valve 58 is disposed in the inlet, and permits only the inward flow of the working water into the work chamber 56. The check valve 57 and the check valve 58 may be made of a lead valve or a ball valve.

A second end of the respective work chamber 56 has a second gateway section which communicates with the pump 30. The second gateway section communicates with only one pump chamber defined by the one cylinder 33 and the one piston 36.

The work chamber 46, 56 corresponds to a passage through which the working water passes as a refrigerant. Working water flows along the longitudinal direction of the work chamber 46, 56 in both directions (leftward and rightward).

Furthermore, the work chamber 46, 56 provides an accommodation chamber accommodating the magneto-caloric element 49, 59. The housing 41, 51 provides a container defining the work chamber 46, 56. The MCE element 49, 59 is arranged in the work chamber 46, 56 as a magnetic working substance which has magneto-caloric effect.

When the external magnetic field is applied to the MCE element 49, 59, electron spins gather in the direction of the magnetic field. At this time, magnetic entropy decreases and the temperature is raised by emitting heat.

When the external magnetic field is removed from the MCE element 49, 59, the electron spins become to have disordered state. At this time, magnetic entropy increases and the temperature is lowered by absorbing heat.

The MCE element 49, 59 is made of magnetic substance which has a high magneto-caloric effect in an ordinary temperature region. For example, the MCE element 49, 59 may be made of a gadolinium(Gd)-base material or lanthanum-iron-silicon compound. Alternatively, a mixture of manganese, iron, phosphorus, and germanium may be used.

The MCE element 49, 59 has a bar (stick) shape extending in the axis direction of the MCD unit 40, 50. The MCE element 49, 59 is shaped to sufficiently be able to exchange heat with the working water flowing through the work chamber 46, 56. The respective MCE element 49, 59 may be referred as an element bed.

In this embodiment, a MCE element disposed between the high temperature end 11 and the low temperature end 12 is constructed by the first MCE element 49 and the second MCE element 59. The first MCE element 49 is arranged in the first MCD unit 40, and has the middle low temperature end 13 opposing to the motor 30 and the high temperature end 11 opposing to outside. The middle low temperature end 13 and the high temperature end 11 oppose with each other through the first MCE element 49. The second MCE element 59 is arranged in the second MCD unit 50, and has the low temperature end 12 opposing to outside and the middle high temperature end 14 opposing to the pump 30. The middle high temperature end 14 and the low temperature end 12 oppose with each other through the second MCE element 59.

As shown in FIG. 2, the MCE element 49 has plural element units 60, 61, 62 (hereinafter referred as 60-62). The plural element units 60-62 are arranged in the longitudinal direction of the MCE element 49, that is, along the flowing direction of the working water. Thermal conduction is allowable among the plural element units 60-62.

The MCE element 59 has plural element units 63, 64, 65 (hereinafter referred as 63-65). The plural element units 63-65 are arranged in the longitudinal direction of the MCE element 59, that is, along the flowing direction of the working water. Thermal conduction is allowable among the plural element units 63-65.

The MCE element 49, 59 is influenced by the external magnetic field impressed or removed by the rotor core 44, 54 and the permanent magnet 45, 55. That is, when the revolving shaft 42, 52 rotates, the external magnetic field is alternately applied or removed so that the MCE element 49, 59 is alternately magnetized or non-magnetized.

Moreover, the respective MCD unit 40, 50 has the plural MCE elements 49, 59 which are thermally connected in parallel. For example, in the first MCD unit 40, the five MCE elements 49 are thermally connected in parallel. Further, the five MCE elements 59 are thermally connected in parallel, in the second MCD unit 50.

Furthermore, the first and second MCE elements 49, 59 of the first and second MCD units 40, 50 construct one MCE element by a thermally series connection.

The first shift 70 is disposed between the revolving shaft 32 of the pump 30 and the revolving shaft 42 of the first MCD unit 40. The first shift 70 controls a rotation speed and/or a rotation phase between the revolving shaft 32 and the revolving shaft 42.

The second shift 80 is disposed between the revolving shaft 32 of the pump 30 and the revolving shaft 52 of the second MCD unit 50. The second shift 80 controls a rotation speed and/or a rotation phase between the revolving shaft 32 and the revolving shaft 52.

The motor 20 is connected to the revolving shaft 52 of the second MCD unit 50, for example. The first shift 70 and the second shift 80 control the rotation relationship among the revolving shaft 32 of the pump 30, the revolving shaft 42 of the first MCD unit 40, and the revolving shaft 52 of the second MCD unit 50, so as to realize the AMR cycle.

A passage portion 71 is arranged between the pump 30 and the first MCD unit 40, and defines a passage for the working water. The one cylinder 33 and the one work chamber 46 communicate with each other through, the passage defined by the passage portion 71.

A passage portion 81 is arranged between the pump 30 and the second MCD unit 50, and defines a passage for the working water. The one cylinder 33 and the one work chamber 56 communicate with each other through the passage defined by the passage portion 81.

A plurality of MHP units is constructed by the first MCD unit 40 and the multi-cylinder piston pump defined in the right half of the pump 30. Specifically, five MHP units are constructed. The plurality of MHP units is thermally connected in parallel.

A plurality of MHP units is constructed by the second MCD unit 50 and the multi-cylinder piston pump defined in the left half of the pump 30. Specifically, five MHP units are constructed. The plurality of MHP units is thermally connected in parallel.

Further, the plurality of MHP units located on the right side of the pump 30 and the plurality of MHP units located on the left side of the pump 30 are thermally connected in series.

The shift device 90 has the high-temperature passage controller 90a that invalidates a predetermined part of the magneto-caloric element 49 adjacent to the high temperature end 11, and the low-temperature passage controller 90b that invalidates a predetermined part of the magneto-caloric element 59 adjacent to the low temperature end 12. The passage controller 90a, 90b is arranged at the respective end portion of the MHP unit, so that five passage controllers 90a, 90b are arranged in the circumference direction, as shown in FIG. 3. Further, the passage controllers 90a, 90b are arranged at both end portions of the MHP apparatus 2, respectively. That is, the MHP apparatus 2 has ten passage controllers 90a, 90b, which are located at different positions but have the same construction.

The passage controller 90a, 90b will be specifically described by referring to the passage controller 90a located on the right-lower area of FIG. 2. The plural element units 60-62 are received by the work chamber 46, and the element unit 60 is located at the most peripheral side in the flowing direction of the working water. The passage controller 90a has the bypass passage 91 that connects a left side of the element unit 60 and a right side of the element unit 60 with each other by bypassing the element unit 60, relative to the main passage defined by the work chamber 46 and the element unit 60.

As shown in FIG. 3, the bypass passage 91 is partitioned and defined in the housing 41. A sector-shaped portion is defined between two work chambers 46 distanced in the circumference direction, and the bypass passage 91 is located in the sector-shaped portion. The bypass passage 91 is located adjacent to the work chamber 46 to be bypassed by the bypass passage 91, in the circumference direction. The bypass passage 91 is located not to extend outward from the work chamber 46 in the radial direction.

In FIG. 2, the bypass passage 91 has an opening 92 open to the work chamber 46 at a position between the element unit 60 and the right end of the work chamber 46, and an opening 93 open to the work chamber 46 at a position between the element unit 60 and the adjacent element unit 61 located on the inner side of the element unit 60. The openings 92, 93 are open to the work chamber 46 on both sides of the element unit 60 in the flowing direction of the working water.

The passage controller 90a has the valve device 94 that opens or closes the bypass passage 91. The valve device 94 is constructed by a known valve mechanism such as a butterfly valve. When the bypass passage 91 is opened by the valve device 94, the working water flows through the bypass passage 91, so that the working water is prohibited from flowing through the predetermined part. That is, the valve device 94 switches the working water to flow through the bypass passage 91 or the predetermined part corresponding to the element unit 60.

The passage controller 90a has a drive unit 95 that drives the valve device 94. The drive unit 95 opens or closes the valve device 94 by operating an operation rod of the valve device 94. The drive unit 95 is a temperature-sensitive device working in accordance with temperature.

The drive unit 95 has a temperature detector and a drive mechanism. The temperature detector detects ambient temperature or temperature around the drive unit 95. The drive mechanism drives the valve device 94 in accordance with the detected temperature.

For example, the detector may detect temperature of outside air outside of the passenger compartment to be air-conditioned. The drive unit 95 drives the valve device 94 in accordance with an index relating to the temperature of the high temperature end 11 and/or the low temperature end 12. In this embodiment, the index corresponds to the outside air temperature.

Figure 4:
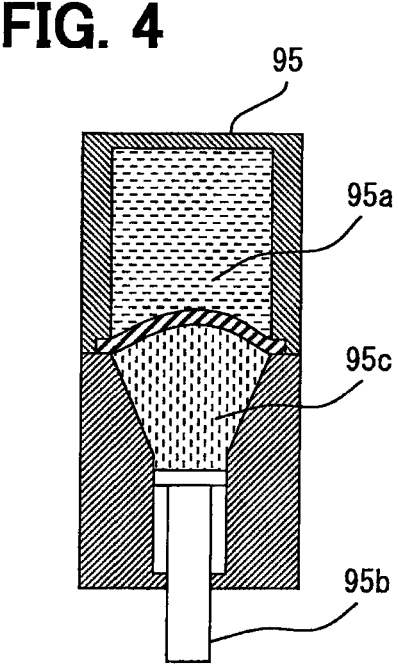
FIG. 4 is a sectional view illustrating a drive unit of a passage controller of a shift device of the magneto-caloric effect heat pump apparatus of the first embodiment at a low temperature time.
Figure 5:
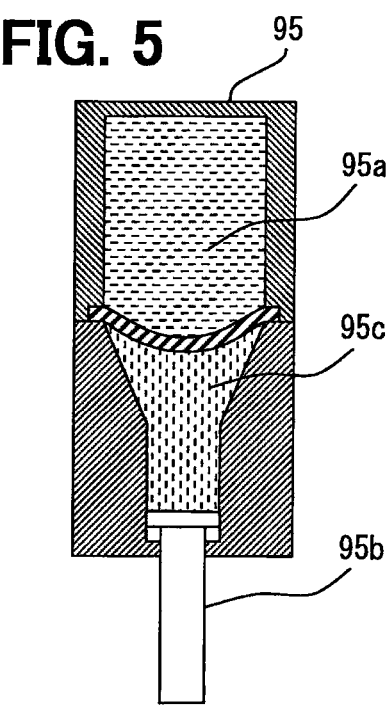
FIG. 5 is a sectional view illustrating the drive unit of the first embodiment at a high temperature time.

FIG. 4 is a cross-sectional view illustrating the drive unit 95 when the outside air temperature is relatively low. FIG. 5 is a cross-sectional view illustrating the drive unit 95 when the outside air temperature is relatively high.

The drive unit 95 has a chamber filled with thermostat wax (thermo-wax) 95a. A volume of the thermo-wax 95a is proportionally changed in accordance with temperature. The change in the volume of the thermo-wax 95a is transmitted to an output rod 95b of the drive unit 95. An amplification chamber 95c is disposed between the thermo-wax 95a and the output rod 95b, and is made of an elastic film and fluid.

The drive unit 95 is located to be able to detect the outside air temperature. When the detected temperature is lower than a predetermined value, the drive unit 95 closes the valve device 94. When the detected temperature is equal to or higher than the predetermined value, the drive unit 95 opens the valve device 94. The predetermined value is set to distinguish winter season and summer season from each other.

Flow resistance of the bypass passage 91 and the valve device 94 is sufficiently small compared with the main passage defined by the work chamber 46 and the element unit 60. When the valve device 94 is opened, the working water flows through the bypass passage 91 by bypassing the element unit 60, so that the heat of the element unit 60 is not transported. Thus, the heat transport is invalidated in the element unit 60, so that the element unit 60 is substantially invalidated.

The air-conditioner 1 has a control device (CNTR) 5. The control device 5 controls plural components of the air-conditioner 1. For example, the control device 5 controls the motor 20 to at least start or stop the MHP apparatus 2. Moreover, the control device 5 controls the first shift 70 and the second shift 80 to switch the state of the rotation speed and/or the rotation phase of the first shift 70 and the second shift 80.

The control device 5 may be constructed by a microcomputer having a media that is readable by a computer. The media stores a program readable by a computer. The media may be a memory. The control device 5 works and functions to practice the above-described controls when the program is executed by the control device 5. The control device 5 may include a functional block or module.

The magneto-caloric effect of the MCE element 49, 59 will be described with reference to FIG. 6. The position arrangement of the MCE element 49, 59 is shown by 6A of FIG. 6, in which the element unit 60, 61, 62, 63, 64, 65 (hereinafter referred as 60-65) and the passage controller 90a, 90b are illustrated. Operation range of the MCE element 49, 59 is shown by 6B of FIG. 6, in which the open/close state of the bypass passage 91 and the valve device 94 and an effective range of the element unit are illustrated. In 6B of FIG. 6, OFF represents the close state, and ON represents the open state.

When the passage controller 90a is OFF and when the passage controller 90b is OFF (90a, 90b: OFF, OFF), the element unit has the effective range of 60-65. When the passage controller 90a is ON and when the passage controller 90b is OFF (90a, 90b: ON, OFF), the element unit has the effective range of 61-65. When the passage controller 90a is OFF and when the passage controller 90b is ON (90a, 90b: OFF, ON), the element unit has the effective range of 60-64. When the passage controller 90a is ON and when the passage controller 90b is ON (90a, 90b: ON, ON), the element unit has the effective range of 61-64.

Figure 6:
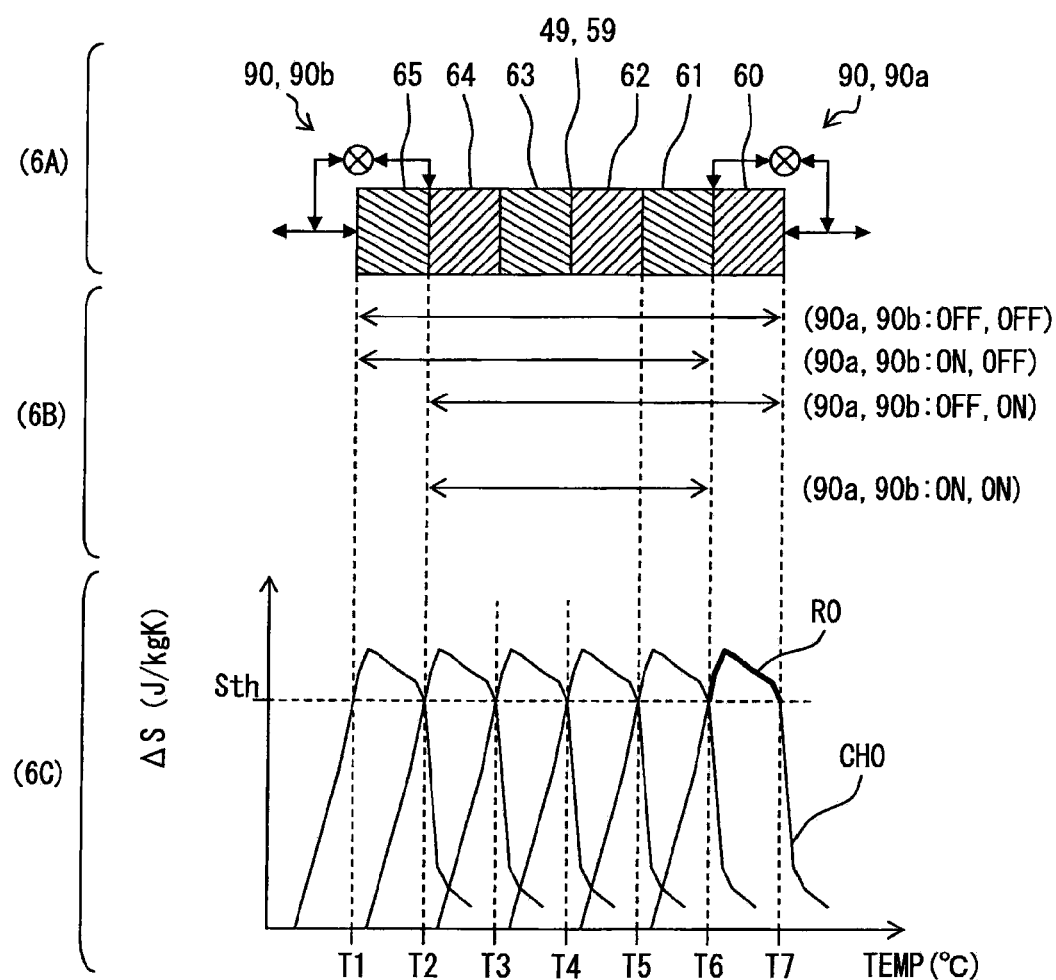
FIG. 6 is an explanatory view illustrating magneto-caloric effect of a magneto-caloric element of the magneto-caloric heat pump apparatus of the first embodiment.

The relationship between the temperature TEMP(° C.) and the magneto-caloric effect $\Delta S(J/kgK)$ is shown by 6C of FIG. 6, in which the magneto-caloric effect of the respective element unit 60-65 is illustrated in a curve line. For example, the magneto-caloric effect of the element unit 60 is represented by a curve line CH0. As shown in a bold line R0, the element unit 60 has high magneto-caloric effect, which is higher than a threshold value Sth, in a temperature range between a temperature T6 and a temperature T7.

Materials respectively constructing the plural element units 60-65 have different Curie temperatures. For example, the Curie temperature of the element unit 60 is higher than the Curie temperature of the element unit 61. The plural element units 60-65 are arranged in order of the Curie temperature so as to correspond to a temperature distribution from the high temperature end 11 to the low temperature end 12. Therefore, the MCE element 49, 59 made of magnetic substance has a distribution of the Curie temperature along a predetermined distribution direction. The predetermined distribution direction corresponds to the longitudinal direction of the work chamber 46, 56 and the flowing direction of the working water. The pump 30 pumps the working water to flow along the predetermined distribution direction to go and return so that the working water transports the heat of the MCE element 49, 59.

The plural element units 60-65 respectively have high magneto-caloric effects ΔS(J/kgK) in temperature zones different from each other. The element unit 60 located most adjacent to the high temperature end 11 has a material composition to have a high magneto-caloric effect in a temperature range that is close to the temperature T7 of the high temperature end 11 in an ordinary operation state of winter season. The element unit 62 located most adjacent to the middle low temperature end 13 has a material composition to have a high magneto-caloric effect in a temperature range that is close to a temperature T4 of the middle low temperature end 13 in an ordinary operation state of winter season. The element unit 63 located most adjacent to the middle high temperature end 14 has a material composition to have a high magneto-caloric effect in a temperature range that is close to the temperature T4 of the middle high temperature end 14 in an ordinary operation state of winter season. The element unit 65 located most adjacent to the low temperature end 12 has a material composition to have a high magneto-caloric effect in a temperature range that is close to a temperature T1 of the low temperature end 12 in an ordinary operation state of winter season.

A temperature zone in which a high magneto-caloric effect is demonstrated is referred as efficient temperature zone. The efficient temperature zone corresponds to the Curie temperature. Upper limit temperature and lower limit temperature of the efficient temperature zone are dependent on, for example, the material composition of the magneto-caloric element 49, 59.

The plural element units 60-65 are arranged in series in a manner that the efficient temperature zones are aligned between the high temperature end 11 and the low temperature end 12. In other words, the efficient temperature zones of the plural element units 60-65 have a distribution to be gradually lowered from the high temperature end 11 to the low temperature end 12. The distribution of the efficient temperature zones approximately corresponds to a temperature distribution defined between the high temperature end 11 and the low temperature end 12 in an ordinary operation state of winter season.

When both of the high-temperature passage controller 90a and the low-temperature passage controller 90b are closed, all the element units 60-65 are used. At this time, the high temperature end 11 is located at the high-temperature end of the element unit 60, and the low temperature end 12 is located at the low-temperature end of the element unit 65. The temperature difference between the temperature T7 of the high temperature end 11 and the temperature T1 of the low temperature end 12 is shared by the element units 60-65.

The respective element unit 60-65 is set to have the efficient temperature zone and the length in the flowing direction of the working water in a manner that all the element units 60-65 can have the high magneto-caloric effect that exceeds the threshold value Sth between the temperature T7 of the high temperature end 11 and the temperature T1 of the low temperature end 12, in winter season.

Moreover, the respective element unit 61-64, which is located on the inner side between the element units 60, 65, is set to have the efficient temperature zone and the length in the flowing direction of the working water in a manner that the element units 61-64 can have the high magneto-caloric effect that exceeds the threshold value Sth between the temperature T6 of the high temperature end 11 and the temperature T2 of the low temperature end 12, in summer season.

The whole units 60-65 of the MCE element 49, 59 are constructed in a manner that the high magneto-caloric effect can be obtained when the low temperature end 12 has the temperature T1 (first temperature), and/or when the high temperature end 11 has the temperature T7 (first temperature). Further, the remainder units 61-64 of the MCE element 49, 59 other than the predetermined unit 60, 65 are constructed in a manner that the high magneto-caloric effect can be obtained when the low temperature end 12 has the temperature T2 (second temperature) and/or when the high temperature end 11 has the temperature T6 (second temperature). The second temperature T2, T6 is different from the first temperature T1, T7.

When the high-temperature passage controller 90a is opened and when the low-temperature passage controller 90b is closed, a predetermined element unit 60 is invalidated and the remainder element units 61-65 are used.

When the high-temperature passage controller 90a is closed and when the low-temperature passage controller 90b is opened, a predetermined element unit 65 is invalidated and the remainder element units 60-64 are used.

When the high-temperature passage controller 90a is opened and when the low-temperature passage controller 90b is opened, predetermined element units 60 and 65 are invalidated and the remainder element units 61-64 are used.

In this embodiment, the valve device 94 of the high-temperature passage controller 90a and the valve device 94 of the low-temperature passage controller 90b are switched to open or close at a condition of the same outside air temperature by the respective drive units 95. Specifically, the drive unit 95 opens the valve device 94 at a predetermined temperature set to correspond to summer season, so that the predetermined element units 60 and 65 are bypassed. At this time, the high temperature end 11 is located at the high-temperature side end of the element unit 61, and the low temperature end 12 is located at the low-temperature side end of the element unit 64. The temperature difference between the temperature T6 of the high temperature end 11 and the temperature T2 of the low temperature end 12 is shared by the remainder element units 61-64.

Thus, the passage controller 90a switches the position of the high temperature end 11 between the right end of the element unit 60 and the right end of the element unit 61. The passage controller 90b switches the position of the low temperature end 12 between the left end of the element unit 65 and the left end of the element unit 64.

In other words, the passage controller 90a, 90b of the shift device 90 moves the position of the high temperature end 11 and/or the low temperature end 12. The passage controller 90a, 90b of the shift device 90 moves the position of the high temperature end 11 and/or the low temperature end 12 to a predetermined position on the MCE element 49, 59 in accordance with the temperature of the high temperature end 11 and/or the low temperature end 12.

The passage controller 90a, 90b moves the high temperature end 11 and/or the low temperature end 12 in a manner that the MCE element 49, 59 placed between the high temperature end 11 and the low temperature end 12 can be located in the efficient temperature zone to demonstrate the high magneto-caloric effect.

The temperature of the high temperature end 11 and the temperature of the low temperature end 12 are approximately determined based on the properties of the MHP equipment 2 and a thermal load such as the outside air temperature. When the passage controller 90a, 90b works based on the outside air temperature, all the element units 60-65 are used in a winter operating state, or only the remainder element units 61-64 are used in a summer operating state. The winter operating state is also referred to as a low temperature operation state, and the summer operating state is also referred as a high temperature operating state.

The magneto-caloric effect of the MCE element 49, 59 in the winter operating state will be described with reference to FIG. 7. The position arrangement of the MCE element 49, 59 is shown by 7A of FIG. 7. Valid range of the MCE element 49, 59 is shown by 7B of FIG. 7. The relationship between the temperature and the magneto-caloric effect is shown by 7C of FIG. 7.

In the winter operating state, the passage controller 90a, 90b makes the working water to flow through the whole of the MCE element 49, 59. Therefore, the high temperature end 11 is located at the right end of the element unit 60, and the low temperature end 12 is located at the left end of the element unit 65. In winter, the high temperature end 11 has the temperature T7, and the low temperature end 12 has the temperature T1. Therefore, all the element units 60-65 can operate in the efficient temperature zones, respectively.

For example, as shown in a bold line R0, the element unit 60 has high magneto-caloric effect. Further, as shown in a bold line R1, the element unit 61 has high magneto-caloric effect. Therefore, high performance can be obtained as the whole of the MCE element 49, 59.

Figure 8:
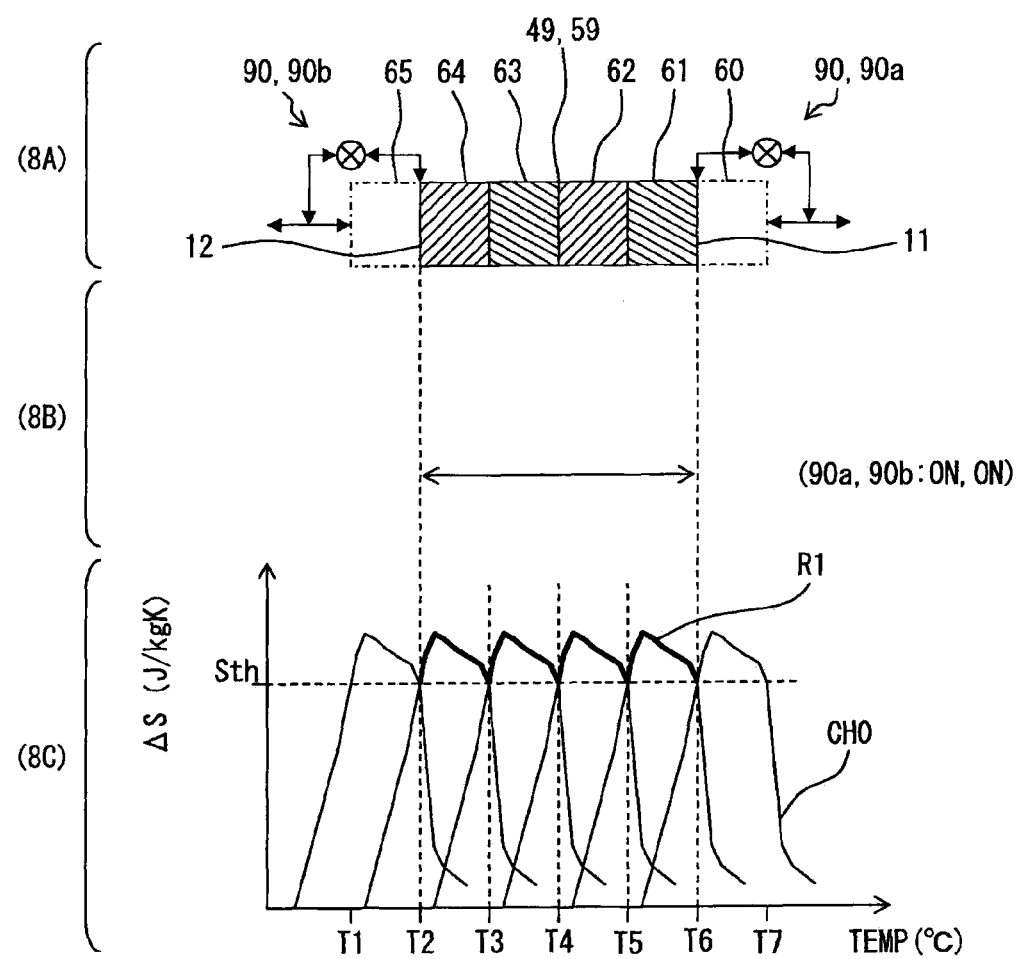
FIG. 8 is an explanatory view illustrating magneto-caloric effect of the magneto-caloric element of the first embodiment at a high temperature time.

The magneto-caloric effect of the MCE element 49, 59 in the summer operating state will be described with reference to FIG. 8. The position arrangement of the MCE element 49, 59 is shown by 8A of FIG. 8. Valid range of the MCE element 49, 59 is shown by 8B of FIG. 8. The relationship between the temperature and the magneto-caloric effect is shown by 8C of FIG. 8.

In summer, the passage controller 90a, 90b invalidates the element units 60 and 65. Therefore, the high temperature end 11 is located at the right end of the element unit 61, and the low temperature end 12 is located at the left end of the element unit 64. In summer, the high temperature end 11 has the temperature T6, and the low temperature end 12 has the temperature T2. Therefore, the remainder element units 61-64 can operate in the efficient temperature zones, respectively.

For example, as shown in a bold line R1, the element unit 61 has high magneto-caloric effect. Therefore, high performance can be obtained as the whole of the MCE element 49, 59.

Figure 9:
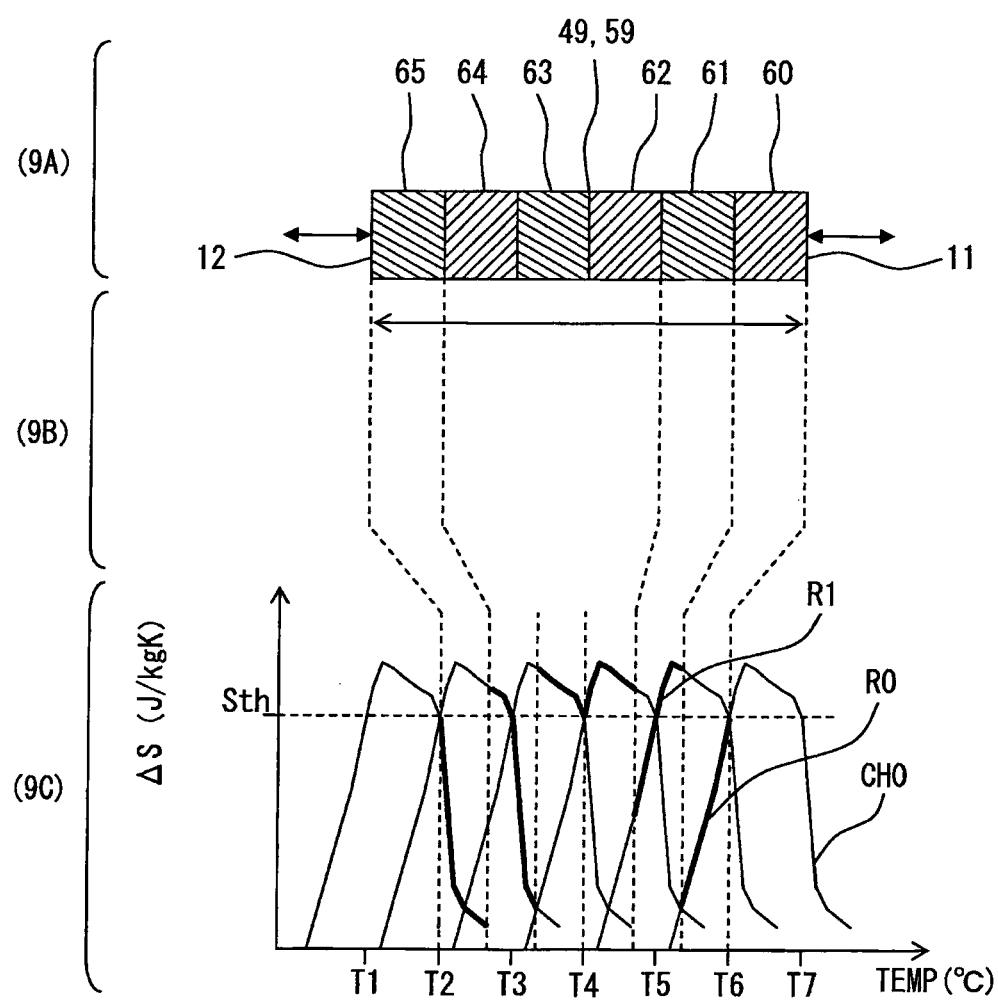
FIG. 9 is an explanatory view illustrating magneto-caloric effect of a magneto-caloric element of a comparison example.

A magneto-caloric effect of a MCE element of a comparison example will be described with reference to FIG. 9. The position arrangement of the MCE element is shown by 9A of FIG. 9. Valid range of the MCE element is shown by 9B of FIG. 9. The relationship between the temperature and the magneto-caloric effect is shown by 9C of FIG. 9. In the comparison example, the MHP apparatus does not have the passage controller 90a, 90b.

Also in the comparison example, in winter, the high temperature end 11 has the temperature T7, and the low temperature end 12 has the temperature T1, so that all the element units 60-65 can operate in the efficient temperature zones, respectively, in the winter.

However, in summer, the high temperature end 11 has the temperature T6, and the low temperature end 12 has the temperature T2. In the comparison example, all the element units 60-65 are used even in summer, and the temperature difference between the temperature T6 and the temperature T2 is shared by the element units 60-65.

As a result, as shown in a bold line R0, the element unit 60 is used in a temperature range where the magneto-caloric effect is small. Further, as shown in a bold line R1, the element unit 61 is used in a temperature range that includes an area where the magneto-caloric effect is small. That is, in the comparison example, the MCE element 49, 59 cannot have high performance when the outside air temperature (thermal load) is varied between winter and summer.

The outside air temperature may become at least minus ten degrees centigrade (−10° C.) in winter, and may become at least thirty-five degrees centigrade (35° C.) in summer. In winter, the temperature T7 of the high temperature end 11 may be about sixty degrees centigrade (60° C.), and the temperature T1 of the low temperature end 12 may be about minus ten degrees centigrade (−10° C.). In summer, the temperature T6 of the high temperature end 11 may be about fifty-five degrees centigrade (55° C.), and the temperature T2 of the low temperature end 12 may be about zero degrees centigrade (0° C.).

Operation of the air-conditioner 1 will be described. When the motor 20 is rotated, the revolving shaft 52 is rotated. The rotor core 54 and the permanent magnet 55 are rotated by the rotation of the revolving shaft 52. Thereby, the external magnetic field is alternately applied to or removed from the magneto-caloric elements 59 by the permanent magnet 55.

The rotation of the revolving shaft 52 is transmitted to the revolving shaft 32 through the second shift 80. When the revolving shaft 32 is rotated, the cam plate 34 is rotated. When the cam plate 34 is rotated, a radially outside portion of the cam plate 34 moves in the axis direction, and the piston 35 and the piston 36 reciprocate in the axis direction. At this time, the volume of the cylinder 33 fluctuates. The working water flows out of the cylinder 33 or flows into the cylinder 33 in accordance with a change in the volume of the cylinder 33.

The piston 36 increases or decreases the volume of the left half of the cylinder 33. When the piston 36 reciprocates, two-direction flows of the working water are generated in the work chamber 56. When the working water flows toward the low temperature end 12 from the middle high temperature end 14, the cold energy of the magneto-caloric element 59 is transported toward the low temperature end 12 from the middle high temperature end 14. Furthermore, a part of the working water existing near the low temperature end 12 flows into the low temperature side circulation passage 16 through the exit. The working water of the low temperature side circulation passage 16 passes through the outdoor heat exchanger 4. At this time, the working water is heated by outside air. That is, the working water cools the outside air. When the working water flows toward the middle high temperature end 14 from the low temperature end 12, the hot energy of the magneto-caloric element 59 is transported toward the middle high temperature end 14 from the low temperature end 12. At this time, the working water flows into the work chamber 56 from the low temperature side circulation passage 16.

Furthermore, the rotation of the revolving shaft 32 is transmitted to the revolving shaft 42 through the first shift 70. When the revolving shaft 42 is rotated, the rotor core 44 and the permanent magnet 45 are rotated. Thereby, the external magnetic field is alternately applied to or removed from the magneto-caloric elements 49 by the permanent magnet 45.

The piston 35 increases or decreases the volume of the right half of the cylinder 33. When the piston 35 reciprocates, two-direction flows of the working water are generated in the work chamber 46. When the working water flows toward the high temperature end 11 from the middle low temperature end 13, the hot energy of the magneto-caloric element 49 is transported toward the high temperature end 11 from the middle low temperature end 13. Furthermore, a part of the working water existing near the high temperature end 11 flows into the high temperature side circulation passage 15 through the exit. The working water of the low temperature side circulation passage 15 passes through the indoor heat exchanger 3. At this time, the working water heats inside air. That is, the working water is cooled by the inside air. When the working water flows toward the middle low temperature end 13 from the high temperature end 11, the cold energy of the magneto-caloric element 49 is transported toward the middle low temperature end 13 from the high temperature end 11. At this time, the working water flows into the work chamber 46 from the high temperature side circulation passage 15.

The second shift 80 synchronizes the rotation of the revolving shaft 52 and the rotation of the revolving shaft 32 so as to realize the AMR cycle by a combination of the switch in the external magnetic field between the applying and the removal for the second MCD unit 50 and the switch in the two-direction flows of the working water by the pump 30.

The first shift 70 synchronizes the rotation of the revolving shaft 42 and the rotation of the revolving shaft 32 so as to realize the AMR cycle by a combination of the switch in the external magnetic field between the applying and the removal for the first MCD unit 40 and the switch in the two-direction flows of the working water by the pump 30.

In order to realize the AMR cycle, the switch in the external magnetic field between the applying and the removal and the switch in the two-direction flows of the working water are combined so as to repeat the following four processes (1), (2), (3) and (4). Due to the AMR cycle, heat is transported stepwise and gradually, so that high efficiency can be obtained in the heat transportation.

(1) Impress the external magnetic field to the MCE element 49, 59 using the magnetic-field applier device 44, 45, 54, 55.

(2) Flow the working water using the pump 30 from the low temperature end 12 toward the middle high temperature end 14 and from the middle low temperature end 13 toward the high temperature end 11 in a period during which the magnetic field is impressed.

(3) Remove the external magnetic field from the MCE element 49, 59 by controlling the magnetic-field applier device 44, 45, 54, 55.

(4) Flow the working water using the pump 30 from the middle high temperature end 14 toward the low temperature end 12 and from the high temperature end 11 toward the middle low temperature end 13 in a period during which the magnetic field is removed.

When the four processes (1), (2), (3) and (4) are repeated by the left half of the pump 30 and the MCD unit 50, the cold energy generated by the magneto-caloric effect is transported toward the low temperature end 12, and the hot energy generated by the magneto-caloric effect is transported toward the middle high temperature end 14. At this time, the magneto-caloric element 59 and the working water serve as a heat reservoir in which the hot energy and cold energy are stored.

When the above-mentioned processes are repeated, the inside of the work chamber 56 serves as a heat reservoir having a temperature gradient, and the temperature gradient gradually becomes large. Finally, in the ordinary operation status, a big temperature difference is generated between the low temperature end 12 and the middle high temperature end 14. The hot energy transported to the middle high temperature end 14 is further transmitted to the first MCD unit 40 via the second shift 80, the pump 30, and the first shift 70.

When the four processes (1), (2), (3) and (4) are repeated by the right half of the pump 30 and the MCD unit 40, the cold energy generated by the magneto-caloric effect is transported toward the middle low temperature end 13, and the hot energy generated by the magneto-caloric effect is transported toward the high temperature end 11. At this time, the magneto-caloric element 49 and the working water serve as a heat reservoir in which the hot energy and cold energy are stored.

When the above-mentioned processes are repeated, the inside of the work chamber 46 serves as a heat reservoir having a temperature gradient, and the temperature gradient gradually becomes large. Finally, in the ordinary operation status, a big temperature difference is generated between the middle low temperature end 13 and the high temperature end 11. The cold energy transported to the middle low temperature end 13 is further transmitted to the second MCD unit 50 via the first shift 70, the pump 30, and the second shift 80.

Thus, in this embodiment, the pump 30 pumps the working water toward the high temperature end 11 from the low temperature end 12, when the external magnetic field is impressed to the magneto-caloric element 49, 59. When the external magnetic field is removed from the magneto-caloric element 49, 59, the heat transport medium is pumped toward the low temperature end 12 from the high temperature end 11.

Furthermore, when the pump 30 pumps the working water toward the high temperature end 11 from the low temperature end 12, the working water is discharged to the high temperature side circulation passage 15 from the high temperature end 11, and the working water is drawn from the low temperature side circulation passage 16 to the low temperature end 12.

Furthermore, when the pump 30 pumps the working water toward the low temperature end 12 from the high temperature end 11, the working water is discharged to the low temperature side circulation passage 16 from the low temperature end 12, and the working water is drawn from the high temperature side circulation passage 15 to the high temperature end 11.

If an attention is paid only to the first MCD unit 40, the pump 30 discharges the working water to the high temperature side circulation passage 15 from the high temperature end 11, when the working water flows toward the high temperature end 11 from the middle low temperature end 13. Furthermore, the pump 30 draws the working water from the high temperature side circulation passage 15 to the high temperature end 11, when the working water flows toward the middle low temperature end 13 from the high temperature end 11.

If an attention is paid only to the second MCD unit 50, the pump 30 discharges the working water to the low temperature side circulation passage 16 from the low temperature end 12, when the working water flows toward the low temperature end 12 from the middle high temperature end 14. Furthermore, the pump 30 draws the working water from the low temperature side circulation passage 16 to the low temperature end 12, when the heat transport medium flows toward the middle high temperature end 14 from the low temperature end 12.

The MCD unit 40, the pump 30, and the MCD unit 50 function as a series of the MHP apparatus 2. As a result, a big temperature gradient arises between the low temperature end 12 and the high temperature end 11. The low-temperature working water flowing out of the low temperature end 12 absorbs heat from outside air in the outdoor heat exchanger 4, and supplies the heat to the low temperature end 12 by returning to the low temperature end 12 again. The MHP apparatus 2 pumps up the heat supplied to the low temperature end 12 to the high temperature end 11. The high-temperature working water flowing out of the high temperature end 11 supplies the heat to inside air in the indoor heat exchanger 3, and receives heat from the high temperature end 11 by returning to the high temperature end 11 again.

The passage controller 90a, 90b closes the bypass passage 91 by closing the valve device 94, when the outside air temperature is lower than 20° C. For this reason, all the element units 60-65 are used, for example, in winter. At this time, all the element units 60-65 can operate in or around the efficient temperature zones. Thus, the magneto-caloric element 49, 59 constructed by the element units 60-65 can have high efficiency and performance.

The passage controller 90a, 90b opens the bypass passage 91 by opening the valve device 94, when the outside air temperature is equal to or higher than 20° C. For this reason, the element units 60 and 65 located at the ends of the element 49, 59 are invalidated and only the remainder element units 61-64 are used, for example, in summer. At this time, the remainder element units 61-64 can operate in or around the efficient temperature zones. Thus, the magneto-caloric element 49, 59 constructed by the remainder element units 61-64 can have high efficiency and performance.

According to the first embodiment, a range of the element units actually used is controlled automatically based on the thermal load. That is, a valid range of the MCE element is controlled automatically based on the thermal load. As a result, even if the thermal load (outside air temperature) of the MHP apparatus 2 is varied, and if the temperature of the high temperature end 11 and/or the temperature of the low temperature end 12 is varied, the high efficiency and performance can be maintained over the wide temperature range.

Second Embodiment

Figure 10:
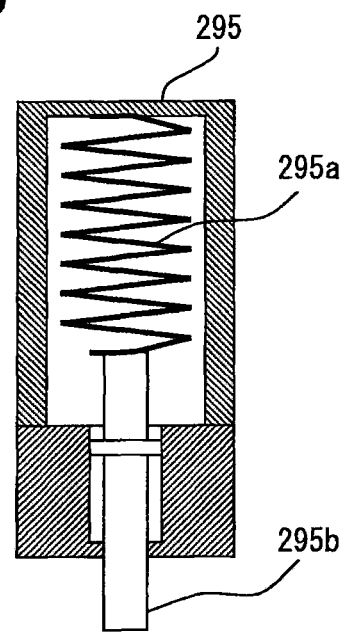
FIG. 10 is a sectional view illustrating a drive unit of a passage controller of a shift device of a magneto-caloric effect heat pump apparatus according to a second embodiment at a low temperature time.
Figure 11:
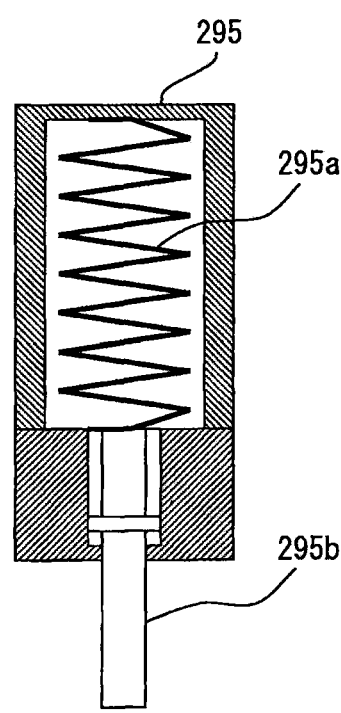
FIG. 11 is a sectional view illustrating the drive unit of the second embodiment at a high temperature time.

FIG. 10 is a sectional view illustrating a drive unit 295 according to a second embodiment at a low temperature time. FIG. 11 is sectional view illustrating the drive unit 295 at a high temperature time. In the second embodiment, a shape-memory alloy component is used instead of the thermostat wax 95a of the first embodiment.

The drive unit 295 includes a coil 295a made of shape-memory alloy which detects the outside air temperature. As shown in FIG. 10, the coil 295a contracts when the outside air temperature is lower than a predetermined temperature, so that the coil 295a draws an output rod 295b of the drive unit 295. As shown in FIG. 11, the coil 295a extends when the outside air temperature is equal to or higher than the predetermined temperature, so that the coil 295a extrudes the output rod 295b. As a result, the drive unit 295 closes the valve device 94, if the outside air temperature is lower than the predetermined temperature. The drive unit 295 opens the valve device 94, if the outside air temperature is equal to or higher than the predetermined temperature. According to the present embodiment, the same advantages can be achieved as the first embodiment.

Third Embodiment

In a third embodiment, an electric control system is used instead of the thermostat wax 95a of the first embodiment.

Figure 12:
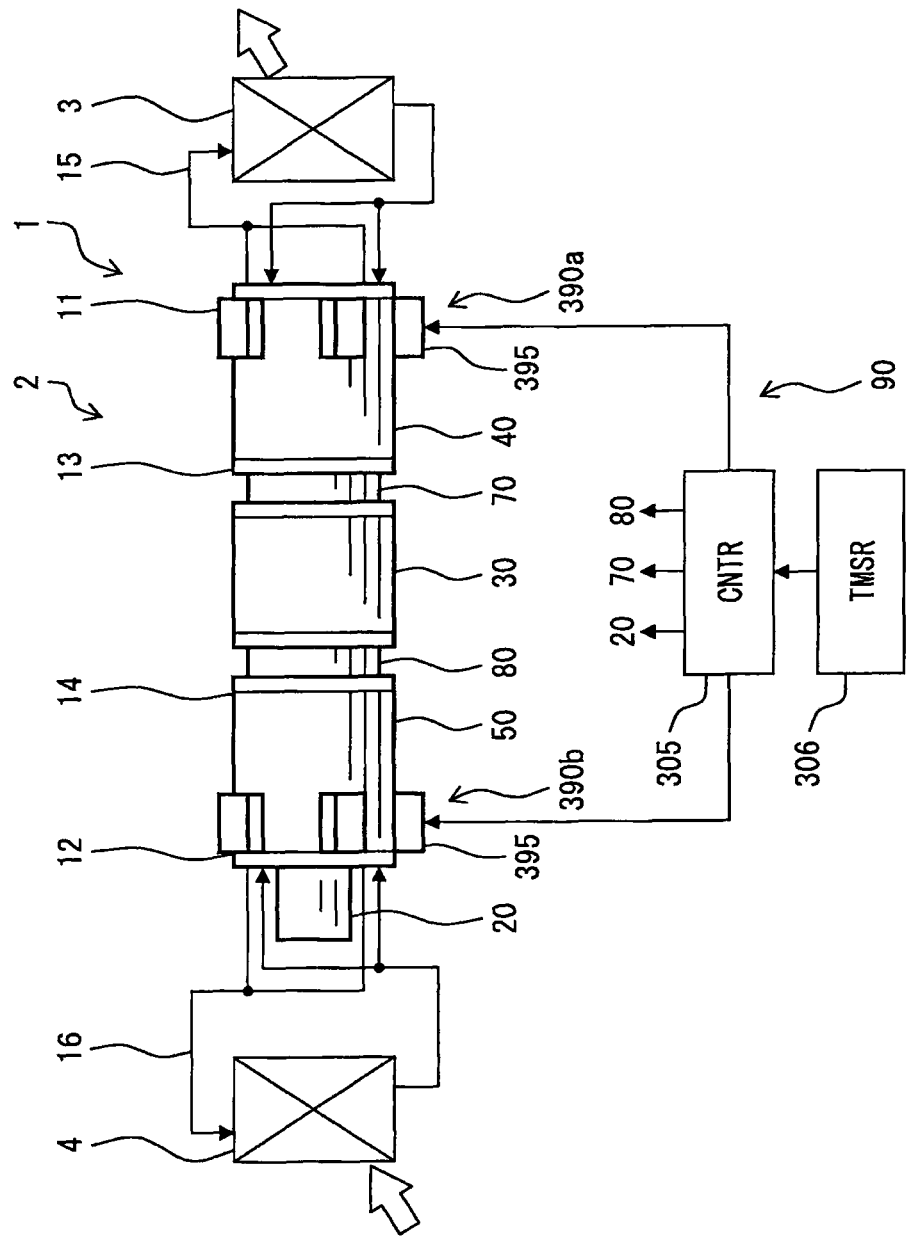
FIG. 12 is a schematic view illustrating an air-conditioner including a magneto-caloric effect heat pump apparatus according to a third embodiment.

As shown in FIG. 12, the shift device 90 has a high-temperature passage controller 390a and a low-temperature passage controller 390b. The passage controller 390a, 390b has an electromagnetic drive unit 395 that is constructed by a rotating electrical device or electromagnet actuator. The shift device 90 has a control device (CNTR) 305 and a temperature sensor (TMSR) 306. The control device 305 opens or closes the valve device 94 by controlling electricity supplied to the drive unit 395 based on the outside air temperature detected by the temperature sensor 306.

The control device 305 opens the valve device 94 by energizing the drive unit 395, if the outside air temperature is equal to or higher than a predetermined temperature. The control device 305 closes the valve device 94 by stopping the electricity supply to the drive unit 395, if the outside air temperature is lower than the predetermined temperature. According to the present embodiment, the same advantages can be achieved as the first embodiment.

Fourth Embodiment

Figure 13:
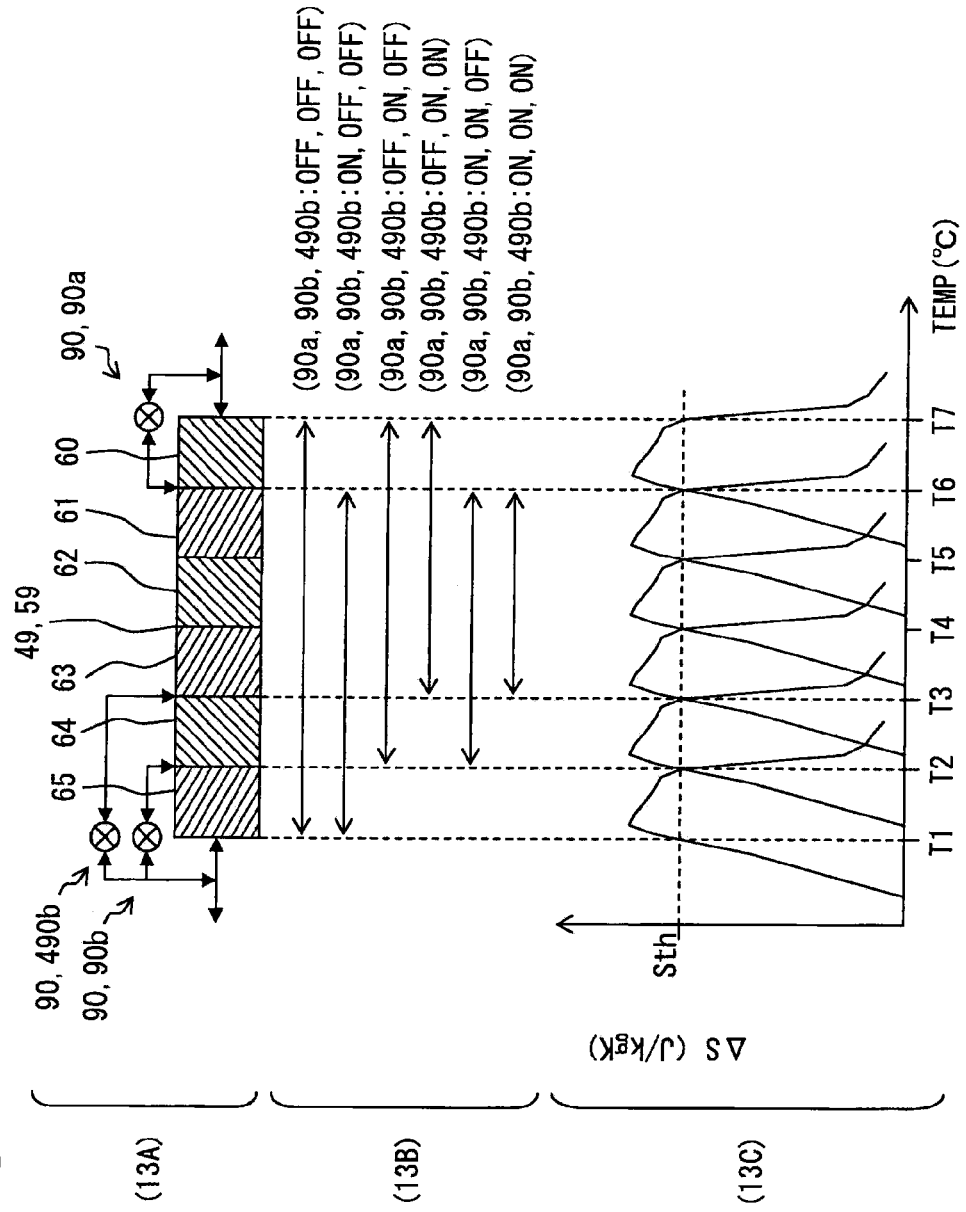
FIG. 13 is an explanatory view illustrating magneto-caloric effect of a magneto-caloric element of a magneto-caloric heat pump apparatus according to a fourth embodiment.

A fourth embodiment will be described with reference to FIG. 13. The position arrangement of the MCE element 49, 59 is shown by 13A of FIG. 13. Valid range of the MCE element 49, 59 is shown by 13B of FIG. 13. The relationship between the temperature and the magneto-caloric effect is shown by 13C of FIG. 13.

Only the most-peripheral element units 60 and 65 are invalidated by the shift device 90 in the first embodiment. In the fourth embodiment, a passage controller 490b is further arranged to invalidate the element unit 64 that is located on the inner side of the element unit 65. In addition, a passage controller may be further arranged to invalidate the element unit 61 that is located on the inner side of the element unit 60.

The passage controller 490b bypasses the element unit 64 and the element unit 65 by opening a valve device in spring and autumn, that is a mid-term between winter and summer. For example, the passage controller 490b is constructed to open the valve device when the outside air temperature is between 10° C. and 20° C., for example. The passage controllers 90a, 90b closes the valve device 94, if the outside air temperature is less than 10° C. If the outside air temperature exceeds 20° C., the valve device 94 is opened. In this embodiment, due to the plural passage controllers 90a, 90b, and 490b, the two element units 64 and 65 located adjacent with each other can be invalidated.

In winter, all the passage controllers 90a, 90b, and 490b are closed, so that all the element units 60-65 are used. In summer, the passage controllers 90a and 90b are opened and the passage controller 490b is closed, so that only the remainder element units 61-64 are used other than the element units 60 and 65. In the mid-term, the passage controllers 90a and 90b are closed and only the passage controller 490b is opened, so that the remainder element units 60-63 are used other than the element units 64 and 65.

Therefore, the passage controller 490b can move only the low temperature end 12 to the left end of the element unit 63. According to this embodiment, a mid-term operating state can be offered in addition to the winter operating state and the summer operating state.

Fifth Embodiment

Figure 14:
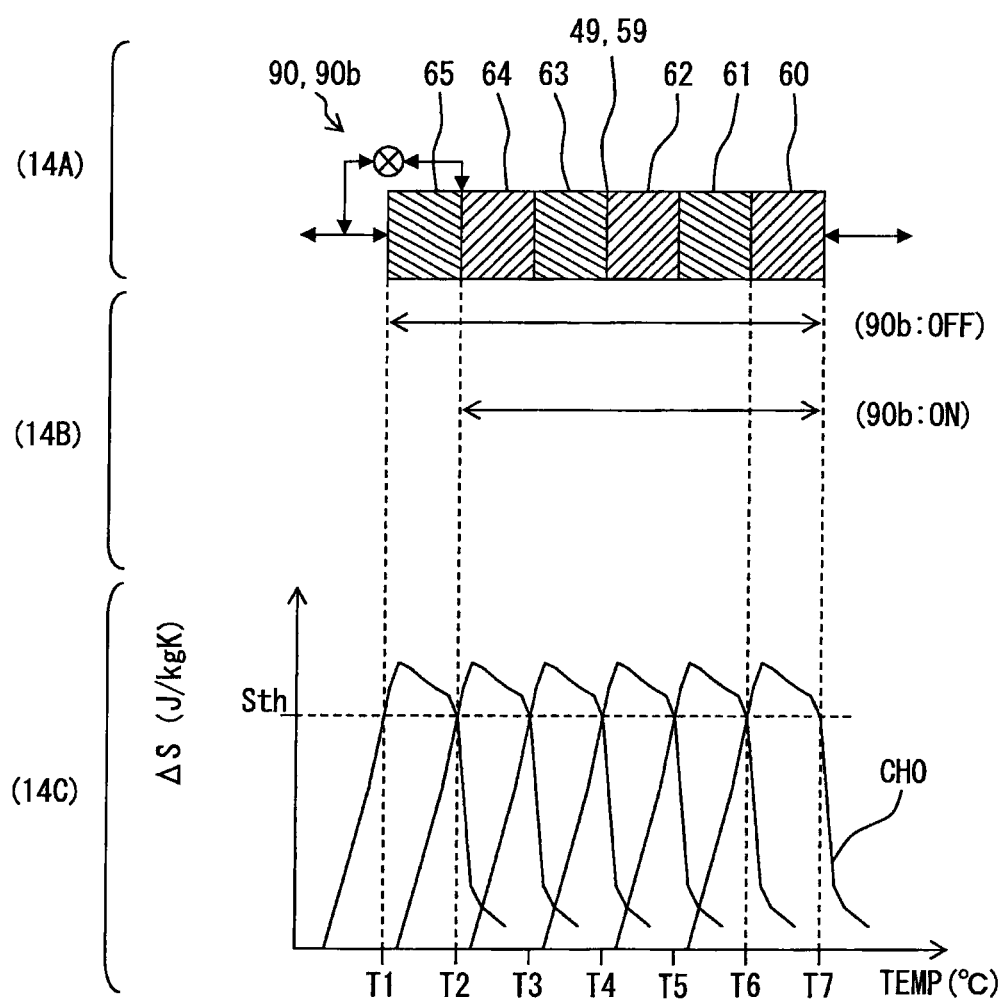
FIG. 14 is an explanatory view illustrating magneto-caloric effect of a magneto-caloric element of a magneto-caloric heat pump apparatus according to a fifth embodiment.
Figure 15:
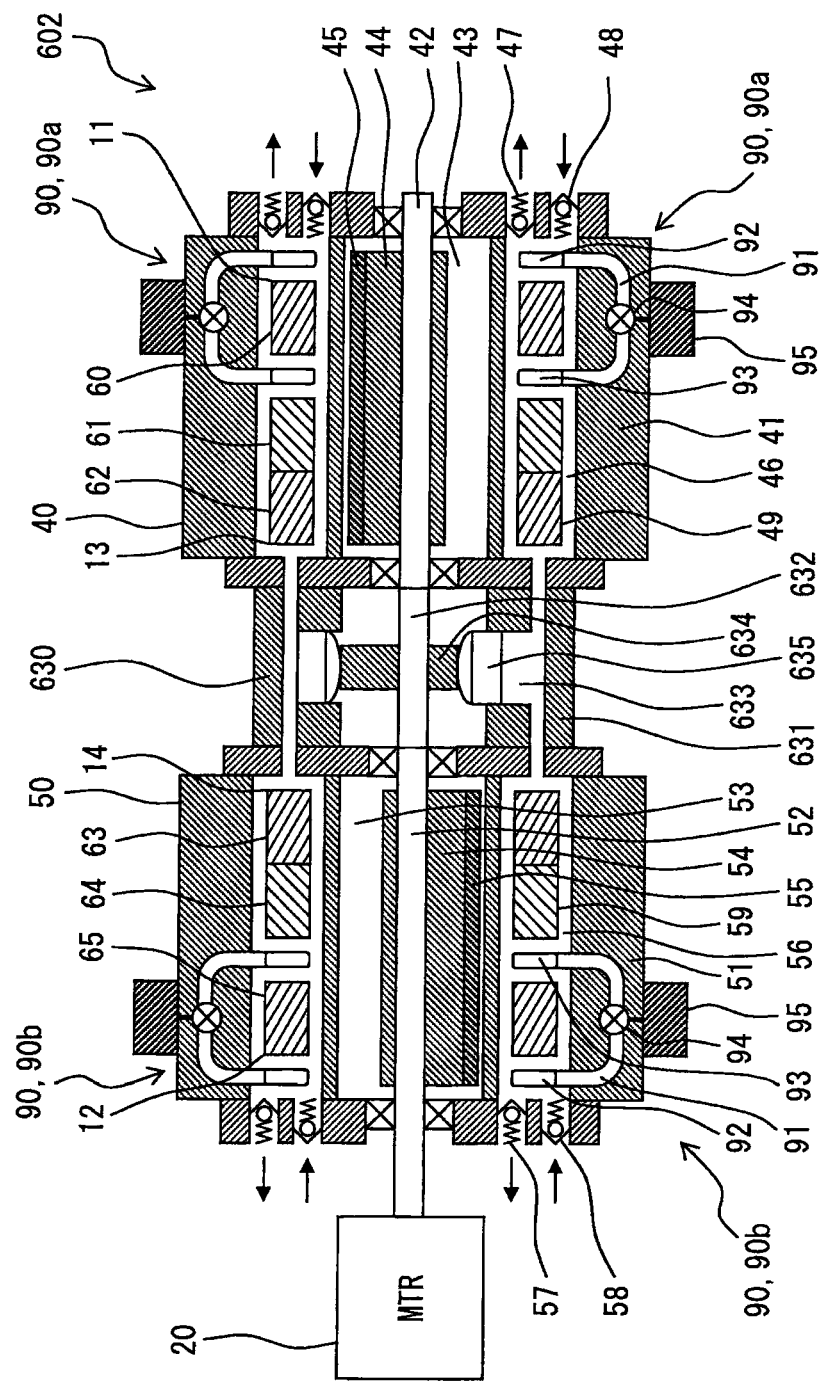
FIG. 15 is a sectional view illustrating a magneto-caloric effect heat pump apparatus according to a sixth embodiment.

A fifth embodiment will be described with reference to FIG. 14. The position arrangement of the MCE element 49, 59 is shown by 14A of FIG. 14. Valid range of the MCE element 49, 59 is shown by 14B of FIG. 14. The relationship between the temperature and the magneto-calorie effect is shown by 14C of FIG. 14.

Both of the most-peripheral element units 60 and 65 are invalidated by the shift device 90 in the first embodiment. In the fifth embodiment, only the passage controller 90b invalidates the element unit 65 only, and the high-temperature side passage controller 90a is eliminated. Therefore, the passage controller 90b of the shift device 90 moves only the low temperature end 12 to the left end of the element unit 64.

According to the fifth embodiment, a range of the magnetic element actually used is controlled automatically based on the thermal load. That is, a valid range of the MCE element is controlled automatically based on the thermal load. As a result, even if the thermal load (outside air temperature) of the MHP apparatus 2 is varied, and if the temperature of the low temperature end 12 is varied, the high efficiency and performance can be maintained over the wide temperature range.

Sixth Embodiment

Figure 7:
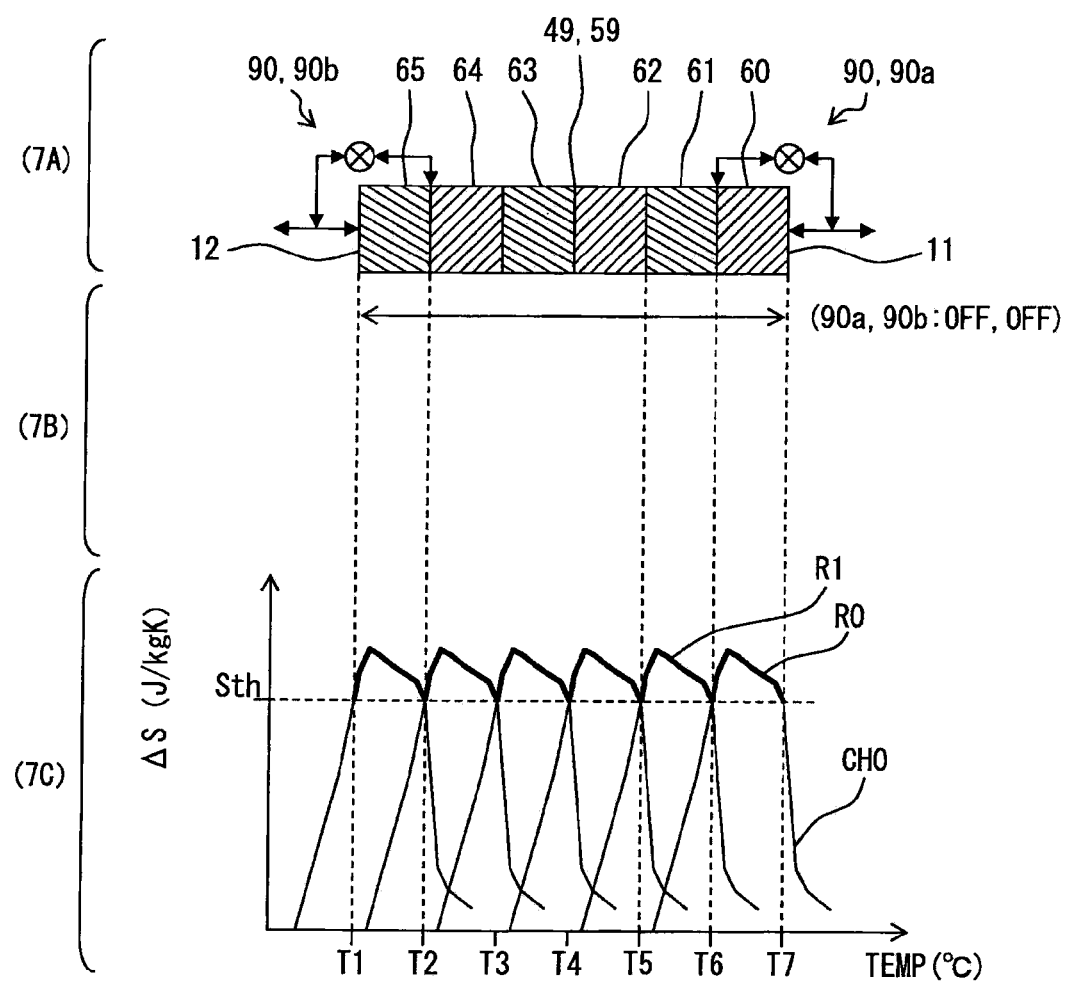
FIG. 7 is an explanatory view illustrating magneto-caloric effect of the magneto-caloric element of the first embodiment at a low temperature time.

FIG. 7 is a sectional view illustrating a MHP apparatus 602 according to a sixth embodiment. The MHP apparatus 602 is used in the air-conditioner 1, instead of the MHP apparatus 2 of the first embodiment. While the pump 30 is made of the swash plate pump in the above embodiments, a pump 630 of the fifth embodiment is made of a radial piston pump. Further, in the sixth embodiment, two work chambers 46, 56 are connected to correspond to one capacity-variable chamber.

The pump 630 has a cylindrical housing 631. The housing 631 supports a revolving shaft 632 rotatably at the center axis. The revolving shaft 632 is directly connected to the revolving shaft 42 and the revolving shaft 52. The housing 631 partitions and defines at least one cylinder 633. The housing 631 partitions and defines plural cylinders 633 arranged at equal intervals, around the revolving shaft 632. For example, the housing 631 partitions and defines five cylinders 633.

The housing 631 accommodates a cam 634. The cam 634 has a cam surface on the outer circumference surface. The cam 634 is coupled to the revolving shaft 632 to rotate with the revolving shaft 632. One piston 635 is arranged in the respective cylinder 633. The piston 635 reciprocates in the cylinder 633 in the radial direction. As a result, a one-cylinder positive-displacement piston pump is defined in the respective cylinder 633. Because the housing 631 has the five cylinders 633, the pump 633 provides a five-cylinder piston pump.

The pump 630 produces parallel flows of the working water for the first MCD unit 40 and the second MCD unit 50, due to a group of chambers. One of the cylinders simultaneously generates a flow flowing from the low temperature end 12 toward the middle high temperature end 14 and a flow flowing from the high temperature end 11 toward the middle low temperature end 13. Further, another one of the cylinders simultaneously generates a flow flowing from the high temperature end 11 toward the middle low temperature end 13 and a flow flowing from the low temperature end 12 toward the middle high temperature end 14.

The pump 630 discharges the working water from the high temperature end 11 to the high temperature side circulation passage 15 when the working water flows from the middle low temperature end 13 toward the high temperature end 11. Further, the pump 630 discharges the working water from the low temperature end 12 to the low temperature side circulation passage 16 when the working water flows from the middle high temperature end 14 toward the low temperature end 12.

The pump 630 draws the working water to the high temperature end 11 from the high temperature side circulation passage 15 when the working water flows toward the middle low temperature end 13 from the high temperature end 11. Further, the pump 630 draws the working water to the low temperature end 12 from the low temperature side circulation passage 16 when the working water flows toward the middle high temperature end 14 from the low temperature end 12.

In a case where the plural work chambers 46, 56 are provided to correspond to one capacity chamber, when the external magnetic field is applied to one of the chambers 46, the external magnetic field is not applied to the other chamber 56. As a result, the magneto-caloric element 49 emits heat in the chamber 46, and the hot energy is transported. Simultaneously, the magneto-caloric element 59 absorbs heat in the chamber 56, and the cold energy is transported.

Seventh Embodiment

The magneto-caloric element 49, 59 has the shape enabling sufficient heat exchange with the working water flowing through the work chamber 46, 56. For example, the MCE element 49, 59 includes plural passages through which the working water flows. The MCE element 49, 59 may be made of an assembly member that has plural clearances for the working water, a block member that has plural holes for the working water, or a porous block member.

Figure 16:
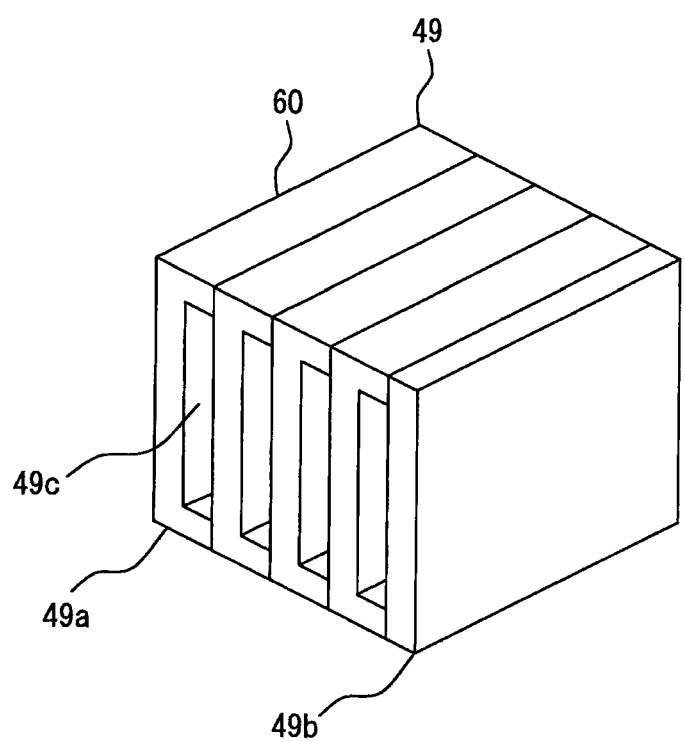
FIG. 16 is a schematic perspective view illustrating a magneto-caloric element according to a seventh embodiment.

More specifically, for example, a magneto-caloric element 49 shown in FIG. 16 may be used in the seventh embodiment. FIG. 16 is a perspective view of the MCE element of the seventh embodiment. The MCE element can be applied to the MHP apparatus of the present disclosure.

As shown in FIG. 16, the magneto-caloric element 49 has a square column shape, and is constructed by layering plural board members 49a, 49b. The board member 49a has a groove 49c that defines a passage for the working water. The board member 49b is located on the end in the layering direction, and has no groove. Alternatively, the magneto-caloric element may be constructed by layering only the same board members having the same shape. The magneto-caloric element 49 has plural passages inside, for the working water. The plural passages facilitate the heat exchange between the element 49 and the working water. The passage is defined between the board members 49a, 49b located adjacent with each other. The magneto-caloric element 59 may have the similar structure as the magneto-caloric element 49.

Eighth Embodiment

The bypass passage 91 is defined for bypassing the element unit 60, 65 located at the most peripheral end, in the first embodiment. The bypass passage 91 extends along with the revolving shaft 42, and is located in the housing 41, 51 on the radially outer side of the element unit 60, 65 that is to be bypassed.

In an eighth embodiment, a bypass passage 891 extends in the radial direction. The eighth embodiment will be described with reference to FIGS. 17, 18 and 19.

Figure 17:
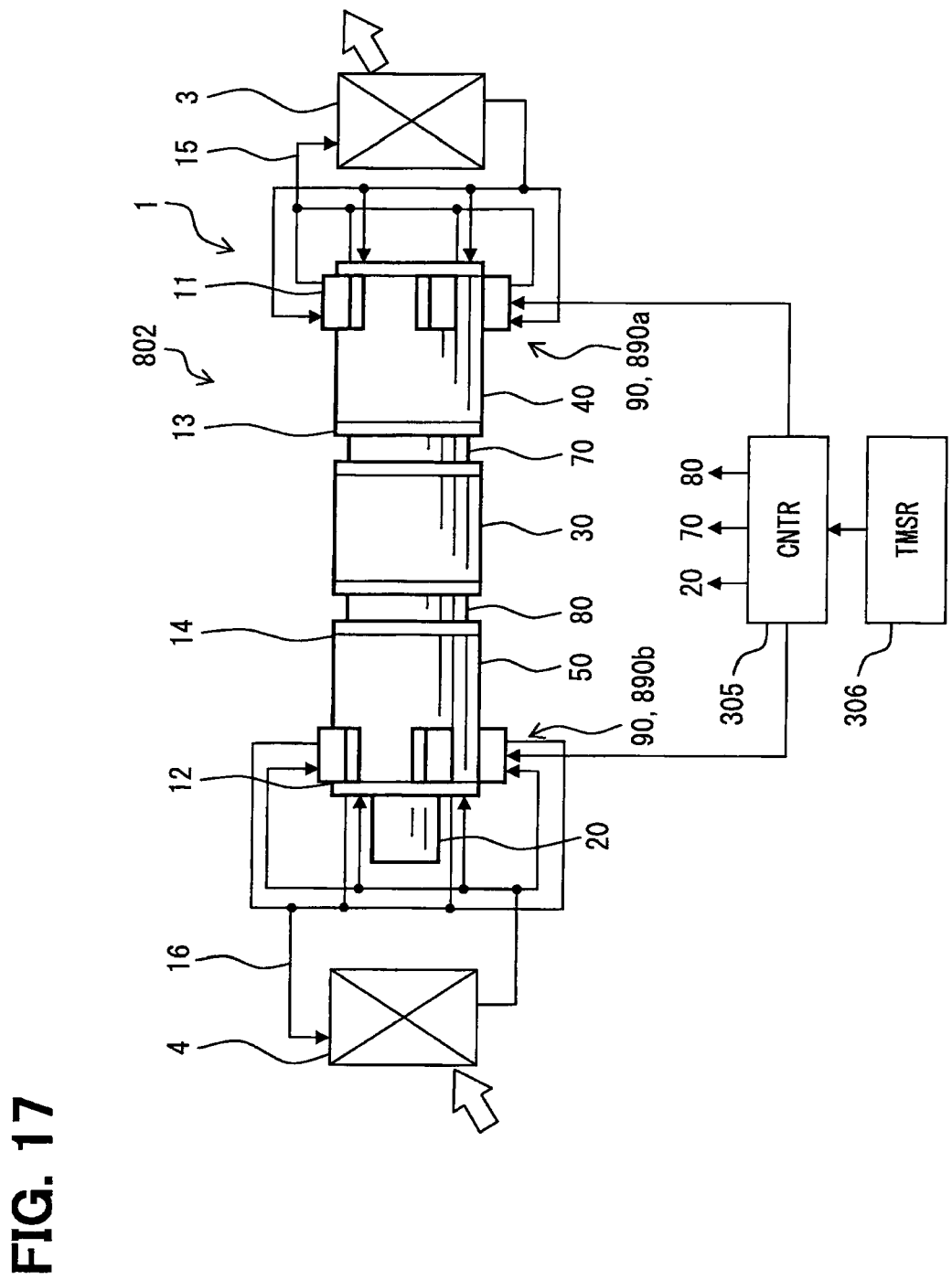
FIG. 17 is a schematic view illustrating an air-conditioner including a magneto-caloric effect heat pump apparatus according to an eighth embodiment.
Figure 18:
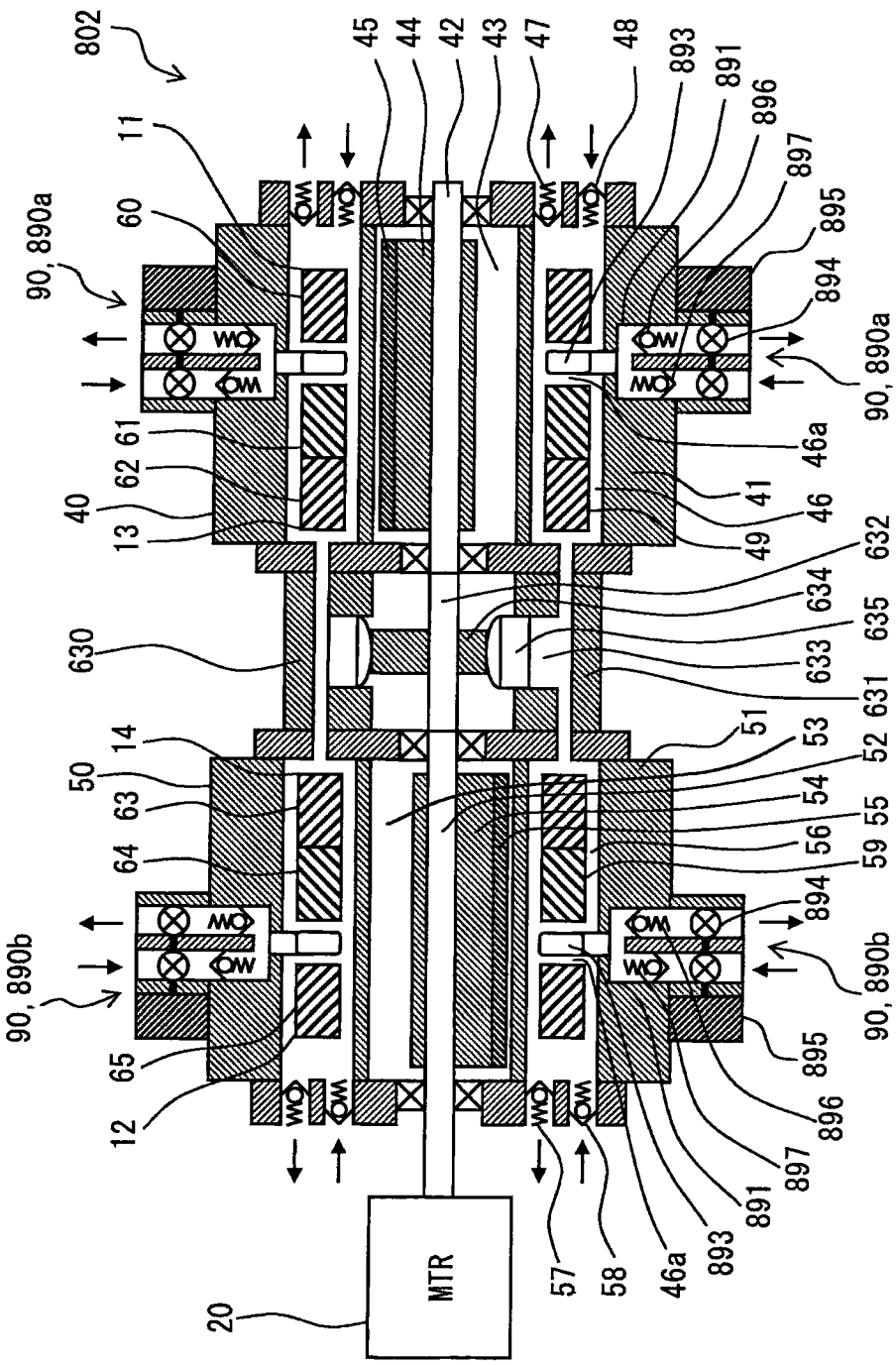
FIG. 18 is a sectional view illustrating the magneto-caloric effect heat pump apparatus of the eighth embodiment.

As shown in FIG. 17, a MHP equipment 802 includes plural shift devices 90. The respective shift device 90 has a high-temperature passage controller 890a and a low-temperature passage controller 890b. As shown in FIG. 18, the passage controller 890a, 890b is constructed in a manner that the working water flows outward in the radial direction of the MHP equipment 802.

The passage controller 890a is connected to the high temperature circulation flow passage 15. The passage controller 890b is connected with the low temperature circulation flow passage 16. The passage controller 890a and the passage controller 890b have the same construction. The passage controller 890a, 890b may correspond to an invalidating device.

The construction of the passage controller 890a, 890b is explained in detail with reference to the passage controller 890a located on the right-lower area of FIG. 18. A clearance 46a is defined between the element unit 60 located at the most peripheral side and the adjacent element unit 61 located at directly inner side of the element unit 60.

The passage controller 890a provides the bypass passage 891 that connects the work chamber 46 to the high temperature circulation flow passage 15, without passing through the most-peripheral element unit 60. The bypass passage 891 is partitioned and defined in the housing 41. The bypass passage 891 extends outward in the radial direction from the work chamber 46. The bypass passage 891 is branched from the clearance 46a.

The bypass passage 891 has an opening 893 opening to the work chamber 46 and located between the element unit 60 and the element unit 61. The working water of the MHP equipment 802 and the high temperature circulation flow passage 15 flows in a main passage defined by the work chamber 46 and the element unit 60. The bypass passage 891 is defined to bypass the main passage.

The passage controller 890a provides a third gateway section for the respective work chamber 46. The third gateway section may be equivalent to the first gateway section. The third gateway section has an exit through which the working water is supplied to the indoor heat exchanger 3, and an inlet through which the working water returns from the indoor heat exchanger 3. A check valve 896 is arranged in the exit, and permits only the outward flow of the working water from the work chamber 46. A check valve 897 is arranged in the inlet, and permits only the inward flow of the working water to the work chamber 46.

The check valves 47, 48 disposed in the first gateway section corresponds to a first conversion valve converting the working water between a both-way flow generated by the pump 30 and a circulation flow circulating in the circulation passage 15, 16.

The check valve 896, 897 disposed in the third gateway section corresponds to a second conversion valve converting the working water between a both-way flow generated by the pump 30 and a circulation flow circulating in the circulation passage 15, 16. The check valve 896, 897 is arranged to be parallel with the check valve 47, 48 in the high temperature circulation flow passage 15.

The MHP equipment 802 has the first check valve 47, 48, 57, 58 which converts the working water between the both-way flow flowing into the element unit 60 corresponding to the predetermined part and the circulation flow flowing into the circulation passage 15, 16.

Further, the MHP equipment 802 has the second check valve 896, 897 which converts the working water between the both-way flow flowing into the bypass passage 891 and the circulation flow flowing into the circulation passage 15, 16. The second check valve 896, 897 has the same function as the first check valve 47, 48.

The passage controller 890a has a valve device 894 which opens or closes the bypass passage 891. The valve device 894 opens or closes both of an exit passage and an inlet passage of the bypass passage 891. The valve device 894 is disposed in the bypass passage 891, and is located on the outer side from the check valve 896, 897.

In other words, the valve device 894 is arranged in the bypass passage 891, and is located between the check valve 896, 897 and the heat exchanger 3, so that the check valve 896, 897 can be located adjacent to the work chamber 46 and the clearance 46a. The passage controller 890a has a drive unit 895 which drives the valve device 894.

Figure 19:
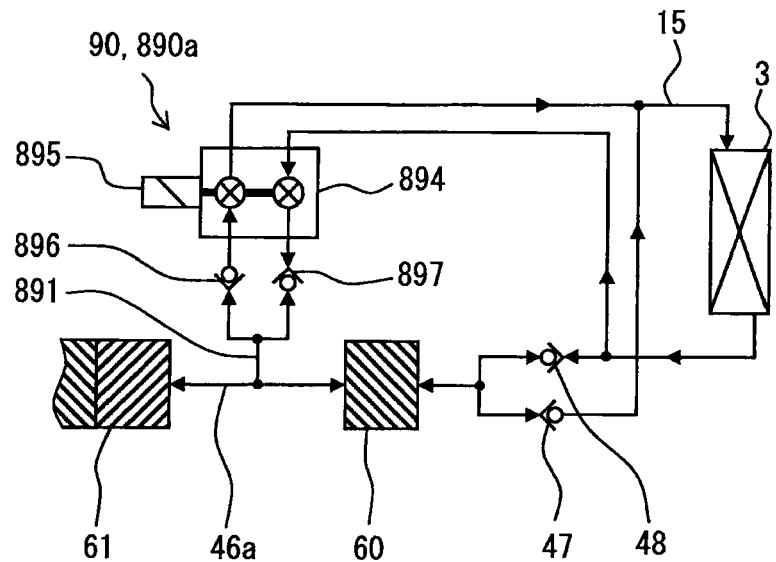
FIG. 19 is a block diagram illustrating a passage defined by a passage controller of a shift device of the magneto-caloric heat pump apparatus of the eighth embodiment.

FIG. 19 illustrates a passage offered by the passage controller 890a, and the passage bypasses the element unit 60 and the check valve 47, 48. When the valve device 894 is closed, working water flows through the check valve 47, 48, and a first pressure loss is generated by the element unit 60 and the check valve 47, 48.

When the valve device 894 is opened, working water flows through the bypass passage 891 and the check valve 896, 897, and a second pressure loss is generated by the bypass passage 891 and the check valve 896, 897. The second pressure loss is set enough smaller than the first pressure loss. The second pressure loss is smaller than about 10% of the first pressure loss. Therefore, the flow of working water can be switched by only opening or closing the valve device 894.

The volume of the clearance 46a is smaller than a volume corresponding to an amplitude of the both-way flow offered by the pump 630. Moreover, the volume of the bypass passage 891 between the element unit 61 and the check valve 896, 897 is smaller than the volume corresponding to the amplitude of the both-way flow offered by the pump 630. Thus, the heat transport can be suitably performed by the working water, without being affected by the clearance 46a.

The bypass passage 891 extends inside of the housing 41, 51 outward in the radial direction, without extending in the axis direction of the MHP equipment 802. Further, the length of the bypass passage 891 in the housing 41, 51 is sufficiently shorter than the length of the element unit 60 in the flowing direction of the working water. Therefore, the length of the bypass passage 891 is shorter than the length of the bypass passage 91 of the first embodiment, in the housing 41, 51. The housing 41, 51 also works as a yoke which supplies a flux of magnetic induction to the most-peripheral element units 60 and 65.

According to the eighth embodiment, the cross-sectional area of the bypass passage 891 can be restricted from being reduced in the housing 41, 51. As a result, a predetermined cross-sectional area of the housing 41, 51 can be maintained so that the flux of magnetic induction can be sufficiently supplied by the housing 41, 51. Therefore, the magnetic resistance can be restricted in the housing 41, 51.

Ninth Embodiment

In the eight embodiment, the passage controller 890a has the check valve 896, 897 and the valve device 894 independent from each other. In a ninth embodiment, a check valve 996, 997 works in accordance with pressure, and corresponds to a valve device to be controlled by external operation.

Figure 20:
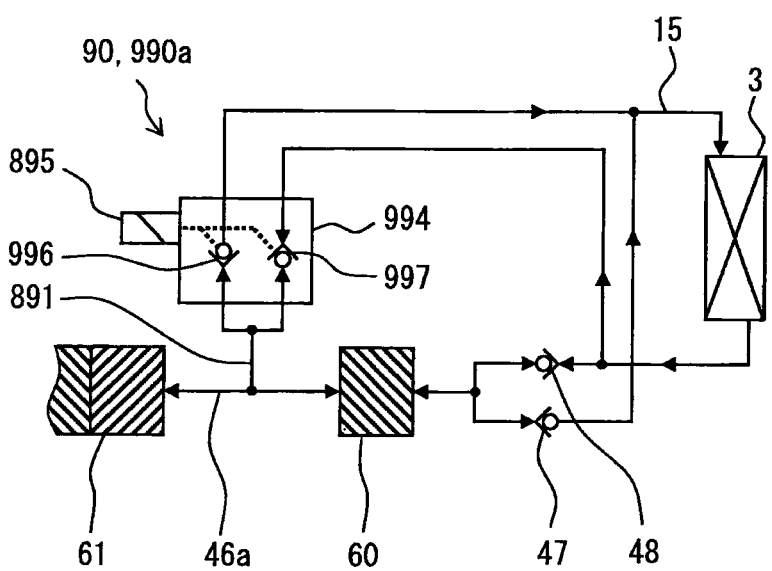
FIG. 20 is a block diagram illustrating a passage defined by a passage controller of a shift device of a magneto-caloric heat pump apparatus according to a ninth embodiment.

FIG. 20 is a block diagram illustrating a part of a MHP equipment according to the ninth embodiment. A passage controller 990a includes the check valve 996, 997. The check valve 996, 997 opens or closes in response to a pressure difference. Furthermore, the check valve 996, 997 can be closed by the drive unit 895. That is, a valve device 994 is constructed by the check valve 996, 997. When the check valve 996, 997 is closed, working water flows through the check valve 47, 48. When the check valve 996, 997 is allowed to open or close in response to the pressure, the working water flows through the bypass passage 891 and the check valve 996, 997.

According to the ninth embodiment, the pressure-responding check valve and the valve device to be controlled from outside can be offered by the common valve 996, 997.

Tenth Embodiment

Figure 21:
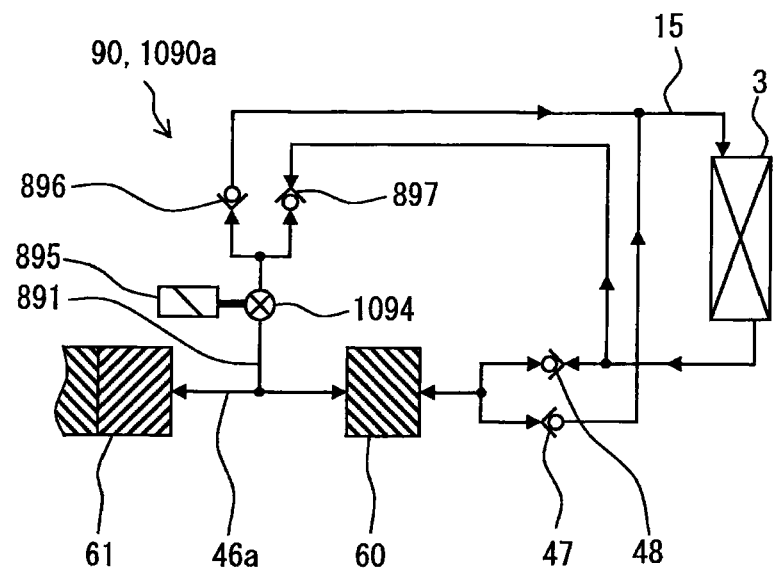
FIG. 21 is a block diagram illustrating a passage defined by a passage controller of a shift device of a magneto-caloric heat pump apparatus according to a tenth embodiment.

A valve device used for opening or closing the bypass passage 891 may be arranged in the bypass passage 891, and may be located on the inner side from the check valve 896, 897. In a tenth embodiment, as shown in FIG. 21, a passage controller 1090a includes a valve device 1094. The valve device 1094 is arranged in the bypass passage 891 and is located between the clearance 46a and the check valve 896, 897. The valve device 1094 is driven by the drive unit 895. According to the tenth embodiment, the bypass passage 891 can be opened or closed in a single passage portion of the bypass passage 891.

Eleventh Embodiment

Figure 22:
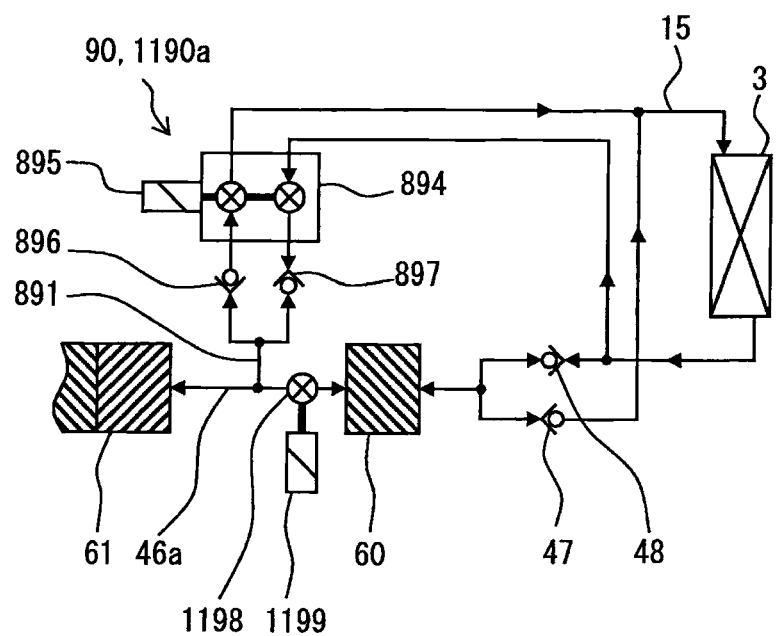
FIG. 22 is a block diagram illustrating a passage defined by a passage controller of a shift device of a magneto-caloric heat pump apparatus according to an eleventh embodiment.

The valve device used for controlling the flow of working water is not limited to be disposed in the bypass passage 891. In an eleventh embodiment, a valve device 1198 may be additionally disposed also in the main passage. As shown in FIG. 22, a passage controller 1190a includes the valve device 1198 and a drive unit 1199.

The valve device 1198 opens or closes the main passage through which the working water flows through the predetermined element unit 60. The valve device 1198 is disposed in the work chamber 46 which corresponds to the main passage. The valve device 1198 is located between a branch part between the main passage and the bypass passage 891 and the element unit 60. The valve device 1198 is an open/close valve which opens/closes a passage passing only the element unit 60.

The valve device 1198 prohibits or allows the flow of working water which passes through the element unit 60. The valve device 1198 is also an invalidating device which invalidates the element unit 60. The valve device 1198 is driven by the drive unit 1199. The drive unit 1199 is controlled to work in response to the drive unit 895. When the drive unit 895 opens the valve device 894, the drive unit 1199 closes the valve device 1198. When the drive unit 895 closes the valve device 894, the drive unit 1199 opens the valve device 1198.

According to the eleventh embodiment, the flow of the working water can be completely stopped in the element unit 60 to be bypassed and invalidated.

Twelfth Embodiment

Figure 23:
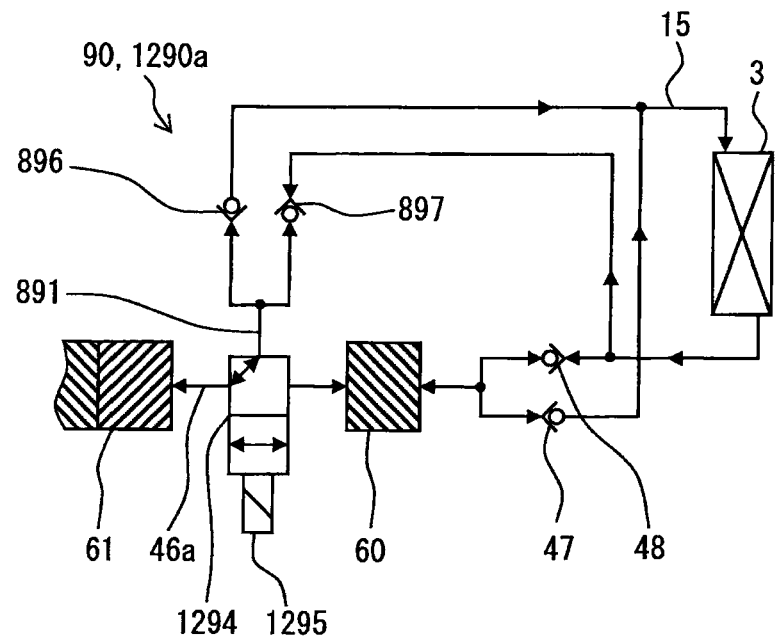
FIG. 23 is a block diagram illustrating a passage defined by a passage controller of a shift device of a magneto-caloric heat pump apparatus according to a twelfth embodiment.

In the eleventh embodiment, the bypass passage and the main passage are completely switched by the two valve devices 894 and 1198. In a twelfth embodiment, the switching may be performed a three-way valve 1294 disposed at a branch point between the clearance 46a and the bypass passage 891. As shown in FIG. 23, a passage controller 1290a includes the three-way valve 1294 and a drive unit 1295.

The three-way valve 1294 is disposed at the branch point between the clearance 46a and the bypass passage 891. The valve 1294 has three ports and two switchers. The valve 1294 opens or closes the bypass passage 891. Simultaneously, the valve 1294 opens or closes the main passage through which the working water flows through the predetermined element unit 60.

The three-way valve 1294 closes the main passage, when the bypass passage 891 is opened. The three-way valve 1294 opens the main passage, when the bypass passage 891 is closed. The three-way valve 1294 selectively switches the working water to flow through the bypath passage 891 or the main passage.

The three-way valve 1294 has a common port communicating with the element unit 61, a main port communicating with only the element unit 60, and a bypass port communicating with only the bypass passage 891. The three-way valve 1294 offers an ordinary mode and a bypass mode. The common port and the main port communicate with each other in the ordinary mode. The common port and the bypass port communicate with each other in the bypass mode.

According to the twelfth embodiment, the bypass passage 891 and the main passage can be selectively switched with the single drive unit 1295.

Thirteenth Embodiment

Figure 24:
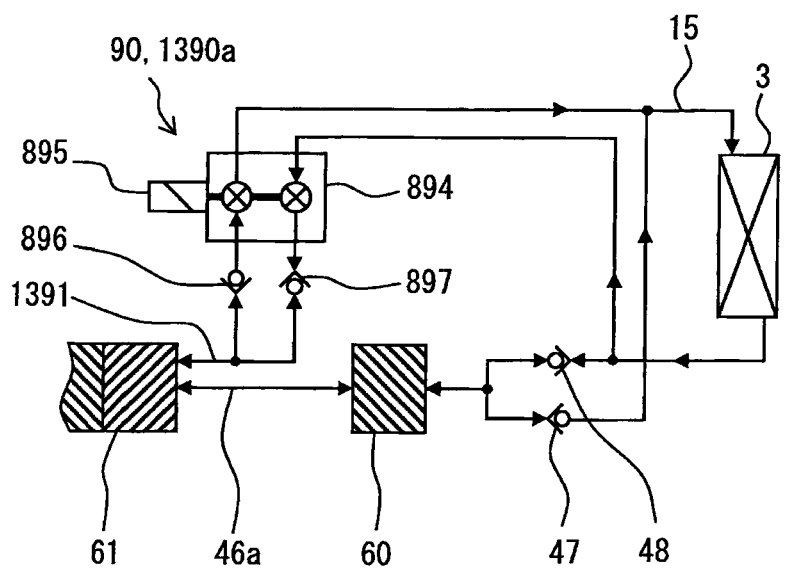
FIG. 24 is a block diagram illustrating a passage defined by a passage controller of a shift device of a magneto-caloric heat pump apparatus according to a thirteenth embodiment.

The bypass passage is not limited to communicate with the clearance 46a. In a thirteenth embodiment, a bypass passage 1391 is set to have direct communication with the element unit 61. As shown in FIG. 24, a passage controller 1290a has the bypass passage 1391 which directly communicates with the element unit 61. The element unit 61 is located at the most peripheral position when the working water bypasses the element unit 60.

Figure 25:
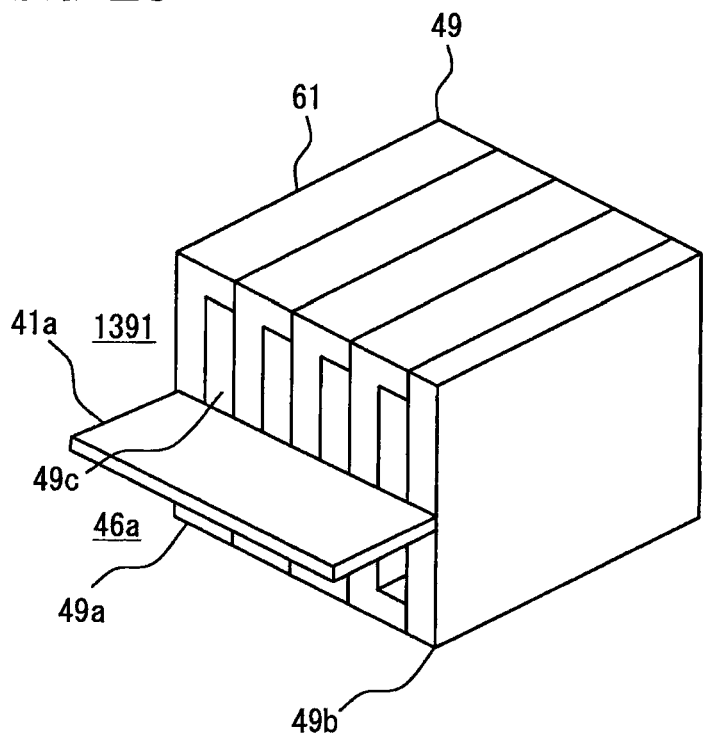
FIG. 25 is a schematic perspective view illustrating the passage of the thirteenth embodiment.

FIG. 25 illustrates an example of the construction which achieves the direct communication between the bypass passage 1391 and the element unit 61. As shown in FIG. 25, a protruding board 41a protrudes from the housing 41 outside of the element unit 61, and divides a passage defined by the element unit 61 into two parts. The protruding board 41 also partitions and defines the work chamber 46. Thus, the bypass passage 1391 and the clearance 46a are defined.

According to the thirteenth embodiment, the volume of the bypass passage 1391 can be reduced. Moreover, the pressure loss of the bypass passage 1391 can be reduced. The volume between the element unit 61 and the check valve 896, 897 is smaller than a volume corresponding to an amplitude of the both-way flow offered by the pump 630. The volume of the clearance 46a is smaller than the volume corresponding to the amplitude of the both-way flow offered by the pump 630. A pressure loss generated when the working water flows through the bypass passage 1391 is smaller than about 10% of a pressure loss generated when the working water flows through the element unit 60.

Fourteenth Embodiment

Figure 26:
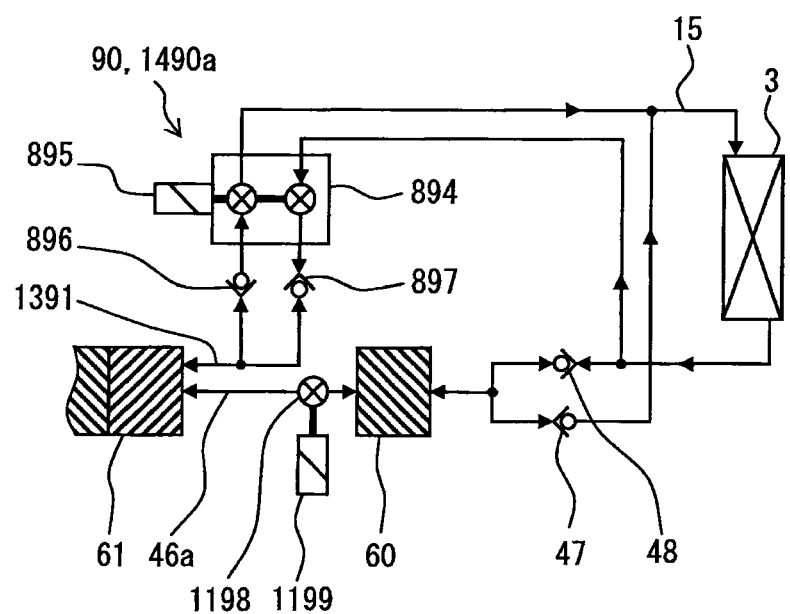
FIG. 26 is a block diagram illustrating a passage defined by a passage controller of a shift device of a magneto-caloric heat pump apparatus according to a fourteenth embodiment.

In fourteenth embodiment, a valve device 1198 is further arranged in the clearance 46a. As shown in FIG. 26, a passage controller 1490a includes the valve device 1198 and a drive unit 1199. According to the fourteenth embodiment, the flow of the working water can be completely stopped in the element unit 60 to be bypassed and invalidated.

Fifteenth Embodiment

Figure 27:
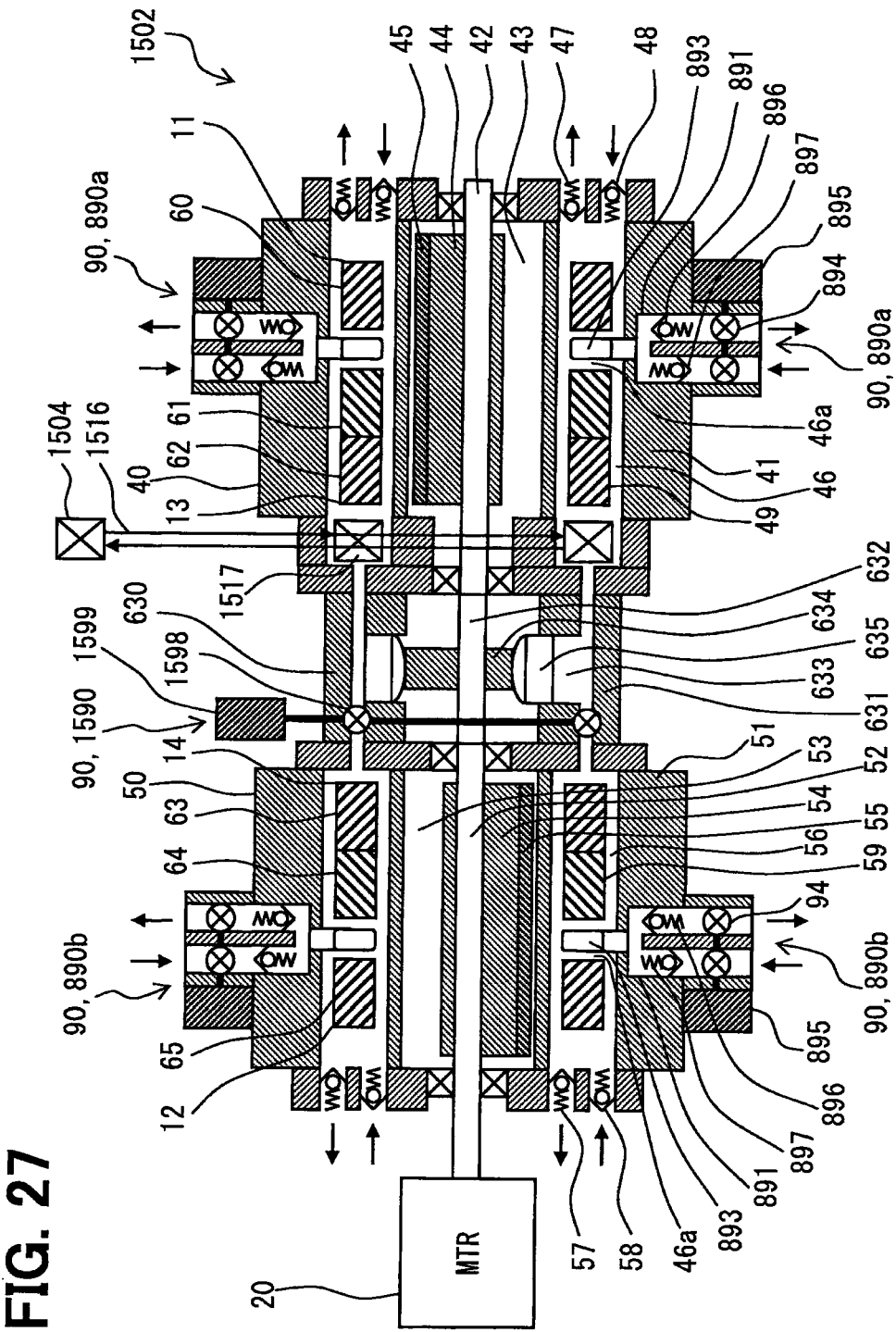
FIG. 27 is a sectional view illustrating a magneto-caloric effect heat pump apparatus according to a fifteenth embodiment.

In the above embodiments, a part of the MCE element 49 and/or the MCE element 59 is invalidated. In a fifteenth embodiment, the flow of the working water is stopped in one of the MCE elements 49 and 59, so that the one of the MCE elements 49 and 59 is invalidated. FIG. 27 illustrates a MHP apparatus 1502 according to the fifteenth embodiment The MHP apparatus 1502 has a passage controller 1590 that invalidates the second MCD unit 50. The passage controller 1590 has a valve device 1598 that stops the flow of working water, and a drive unit 1599 that drives the valve device 1598. The valve device 1598 opens or closes plural passages through which the pump 630 and the second MCD unit 50 communicate with each other. The working water is made to intermittently flow between the pump 630 and the second MCD unit 50 by the valve device 1598. The whole of the second MCD unit 50 is invalidated by stopping the communication between the pump 630 and the second MCD unit 50.

The valve device 1598 corresponds to an invalidating device which invalidates the MCE elements 59 of the second MCD unit 50. The valve device 1598 opens or closes passages through which the working water passes through the element units 63-65. The element units 63-65 correspond to a predetermined part of the magnetic element. The passage controller 1590 corresponds to the shift device 90 that moves the low temperature end of the MHP equipment 1502 from the low temperature end 12 to the middle low temperature end 13.

The MHP apparatus 1502 has a middle heat system that supplies hot energy to the middle low temperature end 13 and that gains cold energy from the middle low temperature end 13. The middle heat system has an intermediate heat exchanger 1517 disposed between the middle low temperature end 13 and the pump 630. The intermediate heat exchanger 1517 is arranged in each of the work chambers 46. A heat exchange capacity of the intermediate heat exchanger 1517 may be set correspondingly to the cold energy obtained by the middle low temperature end 13.

Brine fluid is supplied to the intermediate heat exchanger 1517 via a middle circulation passage 1516 as a heat transport medium. Heat exchange is performed between the working water and the brine fluid in the intermediate heat exchanger 1517. The working water existing near the middle low temperature end 13 is cooled by the middle low temperature end 13. As a result, the intermediate heat exchanger 1517 cools the brine fluid. The middle circulation flow passage 1516 supplies the brine fluid to an external heat exchanger 1504. For example, the external heat exchanger 1504 can be used as a cooler in the air-conditioner 1.

The whole of the MCE element 49, 59 is constructed to have high magneto-caloric effect when the low temperature end 12 has the first temperature T1. Further, the remainder MCE element 49 other than the predetermined part 59 is constructed to have high magneto-caloric effect when the middle low temperature end 13 has the second temperature T4 different from the first temperature T1.

Therefore, if the high temperature end and the low temperature end are positioned at the both ends of the whole MCE element 49, 59, high magneto-caloric effect can be acquired when the low temperature end 12 has the first temperature T1. Moreover, if the high temperature end and the low temperature end are positioned at the both ends of the remainder MCE element 49, high magneto-caloric effect can be acquired when the middle low temperature end 13 has the second temperature T4.

While the valve device 1598 opens the passage, heat is transported by both of the first MCD unit 40 and the second MCD unit 50. As a result, hot energy is obtained by the high temperature end 11, and cold energy is obtained by the low temperature end 12.

When the valve device 1598 closes the passage, the working water is not supplied to the second MCD unit 50. As a result, the second MCD unit 50 is invalidated. At this time, heat is transported by only the first MCD unit 40. As a result, hot energy is obtained by the high temperature end 11, and cold energy is obtained by the middle low temperature end 13. The cold energy acquired by the middle low temperature end 13 is taken out by a heat carry device and is used.

The MHP apparatus 1502 has the two MCE elements 49 and 59 oppose to each other through the pump 630, and can offer the high temperature end 11 and the low temperature end 12 by the two MCE elements 49 and 59. Further, the MHP apparatus 1502 can offer the high temperature end 11 and the middle low temperature end 13 by activating only the first MCE element 49.

According to the fifteenth embodiment, the MCE element 59 can be validated or invalidated based on a temperature of a heat source such as a temperature of a low temperature end. As a result, the valid range of the MCE element is changed between both of MCE elements 49 and 59 and only the MCE element 49. Therefore, the MHP apparatus 1502 can be operated with the high magneto-caloric effect, even if the temperature of the heat source is varied.

The intermediate heat exchanger 1517 may be replaced with a heat exchanger which gains the cold energy from the middle low temperature end 13 via the housing 41. For example, the intermediate heat exchanger may be disposed outside of the housing 41, at a position where the low temperature of the middle low temperature end 13 appears. More specifically, the intermediate heat exchanger may be arranged to be located on the outer side of the middle low temperature end 13 in the radial direction. The intermediate heat exchanger may be located at a part or all of the housing 41 in the circumference direction.

In the intermediate heat exchanger 1517, heat exchange is performed between the working water and the brine fluid. Alternatively, heat exchange may be performed between the working water existing near the middle low temperature end 13 and a medium works as a heat source. For example, heat exchange may be directly performed between the working water and air. Furthermore, heat exchange may be directly performed between the middle low temperature end 13 and the brine fluid.

In the fifteenth embodiment, the passage controller 1590 and the middle heat system are provided to invalidate the MCE elements 59 of the MCD unit 50. Alternatively, the passage controller 1590 and the middle heat system may be provided to invalidate the MCE elements 49 of the MCD unit 40.

Other Embodiments

The present disclosure is not limited to the above embodiments.

The MHP apparatus 2 is used as the supply source of hot energy in summer and winter. Alternatively, the MHP apparatus may be used as a supply source of hot energy in winter, and may be used as a supply source of cold energy in summer.

The MHP apparatus 2 is not limited to have the above construction in which the MCD units 40, 50 oppose each other through the pump 30. Alternatively, the MHP apparatus may be constructed by a half of the pump 30 and one of the MCD units 40, 50. For example, the MHP apparatus may be constructed by the right half of the pump 30 and the MCD unit 40. In this case, the outdoor heat exchanger 4 may be arranged between the pump 30 and the MCD unit 40.

The magnetic-field applier device may be defined by a movement of the magneto-caloric element, instead of the rotation of the permanent magnet. An electromagnet may be used instead of the permanent magnet.

The passage controller controls the flow of working water as the shift device 90. Alternatively, the shift device 90 may control the external magnetic field applied to or removed from the element unit 60, 65 to invalidate the element unit 60, 65.

The high-temperature passage controller 90a and the low-temperature passage controller 90b may work at different temperatures. For example, as the outside air temperature is raised, the high-temperature passage controller 90a is opened at a first temperature, and the low-temperature passage controller 90b is opened at a second temperature higher than the first temperature. Alternatively, as the outside air temperature is raised, the low-temperature passage controller 90b is opened at a first temperature, and the high-temperature passage controller 90a is opened at a second temperature higher than the first temperature.

The drive unit 95 is not limited to drive the valve device 94 based on the outside air temperature. The drive unit 95 may drive the valve device 94 based on an index relevant to a temperature of the high temperature end 11 and/or the low temperature end 12. For example, the drive unit 95 may drive the valve device 94 based on temperature of the working water at the high temperature end 11 or the low temperature end 12, temperature of the housing, or temperature of the MCE element. Moreover, the drive unit 95 may be a handle device through which the valve device 94 is operated manually. Moreover, the controller 305 may estimate the properties of the MHP apparatus 2, and may control the valve device 94 in a manner that the MHP apparatus 2 has high properties.

The valve device 94 is disposed only in the bypass passage 91. The valve device 884 is disposed in the bypass passage 891 and the valve device 1198 is disposed in the main passage. The valve device 1294 is disposed at the branch point between the bypass passage and the main passage.

The valve device is not limited to have the above arrangement. For example, a valve device may be disposed only in the main passage which passes through the predetermined part by controlling the pressure loss in the bypass passage to become larger than the pressure loss in the main passage.

The heat transport medium is not limited to the working water. A first heat transport medium is used for defining the AMR cycle with the electro-caloric element 49, 59. A second heat transport medium is used for transporting the cold energy and/or the hot energy obtained by the MHP apparatus to the heat exchanger 3, 4. The first heat transport medium and the second heat transport medium may be separated from each other. For example, a water circulation circuit and a pump are additionally arranged to transport the hot energy obtained from the high temperature end 11, other than the MHP apparatus.

The multi-cylinder pump is provided by the swash plate pump or the radial piston pump in the above description. Alternatively, other positive-displacement pump may be used as the pump.

One work chamber 46, 56 is arranged to correspond to one cylinder of the pump in the above description. Alternatively, the arrangement may be performed in a manner that plural cylinders correspond to one work chamber, that one cylinder corresponds to plural work chambers, or that plural cylinders correspond to plural work chambers.

The MHP apparatus may be used for an air-conditioner in a residence instead of the vehicle, or may be used for a hot water supplier in which water is heated. The main heat source may be water or sand, other than the outside air.

The present disclosure is described using the MHP apparatus. Alternatively, the present disclosure may be applied to a thereto-magnetic engine apparatus as a thermo-magnetic cycle apparatus. For example, the thermo-magnetic engine apparatus may be provided by controlling phase of the switch in the magnetic field and the switch in the flow of heat transport medium.

Means and functions of the control device may be provided by only software, only hardware or a combination of the software and the hardware. For example, the control device may be made of an analogue circuit.

Such changes and modifications are to be understood as being within the scope of the present disclosure as defined by the appended claims.

What is claimed is:
1. A thermo-magnetic cycle apparatus comprising:
   a magnetic element having a Curie temperature distribution in a predetermined distribution direction;
   a magnetic-field supplier which supplies an external magnetic field to the magnetic element;
   a pump pumping heat transport medium to have a both-way flow in the predetermined distribution direction, the heat transport medium transporting heat of the magnetic element; and
   a bypass device which causes a position of a high temperature end and/or a low temperature end of the magnetic element to move; wherein
   the magnetic element is a magneto-caloric element generating heat when the external magnetic field is applied to and absorbing heat when the external magnetic field is removed from, the magnetic-field supplier is a magnetic field switcher switching the external magnetic field between the applying and the removal of the external magnetic field, the pump pumps heat transport medium to flow from the low temperature end toward the high temperature end when the external magnetic field is applied to the magneto-caloric element, and pumps heat transport medium to flow from the high temperature end toward the low temperature end when the external magnetic field is removed from the magneto-caloric element as the both-way flow, the bypass device invalidates a predetermined part of the magneto-caloric element located on an end portion of the magneto-caloric element, the bypass device has a passage controller that prohibits the heat transport medium from flowing through the predetermined part, the passage controller has a bypass passage bypassing the predetermined part to flow the heat transport medium, and a valve device that switches the heat transport medium to flow through the bypass passage or the predetermined part, the valve device is located in the bypass passage and/or a main passage through which the heat transport medium flows through the predetermined part, the passage controller further has a drive unit that drives the valve device based on an index relating with a temperature of the high temperature end and/or the low temperature end, the magneto-caloric element works as an active magnetic refrigeration cycle, the drive unit includes a temperature detector and a drive mechanism, the temperature detector detects an ambient temperature or a temperature around the drive unit and the drive mechanism drives the valve device in accordance with the temperature detected by the temperature detector, the magneto-caloric element has a plurality of element units that is constructed by the predetermined part and remainders other than the predetermined part, a clearance is defined between the predetermined part and the remainders, the heat transport medium flowing through the clearance, the clearance has a volume smaller than a volume corresponding to an amplitude of the both-way flow of the heat transport medium generated by the pump, the bypass passage is branched from the clearance, and a volume of the bypass passage is smaller than the volume corresponding to the amplitude of the both-way flow of the heat transport medium generated by the pump.

2. The thermo-magnetic cycle apparatus according to claim 1, wherein the plurality of element units are constructed to have high magneto-caloric effect when the low temperature end and/or the high temperature end has a first temperature, and the remainders are constructed to have high magneto-caloric effect when the low temperature end and/or the high temperature end has a second temperature different from the first temperature.

3. The thermo-magnetic cycle apparatus according to claim 2, wherein the plurality of element units respectively have efficient temperature ranges different from each other, the element unit having high magneto-caloric effect in the efficient temperature range, the plurality of element units are arranged in series between the high temperature end and the low temperature end in a manner that the efficient temperature ranges are aligned, and the predetermined part of the magneto-caloric element is constructed by at least one of the plurality of element units located on the end portion of the magneto-caloric element.

4. The thermo-magnetic cycle apparatus according to claim 1, further comprising:

a first check valve which switches the heat transport medium flowing through the predetermined part to have the both-way flow or a circulation flow; and a second check valve which switches the heat transport medium flowing through the bypass passage to have the both-way flow or a circulation flow.

5. The thermo-magnetic cycle apparatus according to claim 1, wherein the index is a temperature of outside air.

6. The thermo-magnetic cycle apparatus according to claim 1, wherein the drive unit is a thermostat wax, a shape-memory alloy component, or a control system including a temperature sensor.

7. The thermo-magnetic cycle apparatus according to claim 1, further comprising:

a low-temperature heat exchanger that exchanges heat with a main heat source;

a low-temperature circulation passage passing through the low-temperature heat exchanger;

a high-temperature heat exchanger that exchanges heat with a thermal load; and a high-temperature circulation passage passing through the high-temperature heat exchanger, wherein the pump discharges the heat transport medium to the high-temperature circulation passage from the high-temperature end when the heat transport medium flows from the low-temperature end to the high-temperature end, the pump draws the heat transport medium from the high-temperature circulation passage to the high-temperature end when the heat transport medium flows from the high-temperature end to the low-temperature end, the pump discharges the heat transport medium to the low-temperature circulation passage from the low-temperature end when the heat transport medium flows from the high-temperature end to the low-temperature end, and the pump draws the heat transport medium from the low-temperature circulation passage to the low-temperature end when the heat transport medium flows from the low-temperature end to the high-temperature end.

8. The thermo-magnetic cycle apparatus according to claim 7, wherein the magneto-caloric element includes a first part arranged in a first unit, the first part having the high-temperature end and a middle low-temperature end opposite from the high-temperature end, and a second part arranged in a second unit, the second part having the low-temperature end and a middle high-temperature end opposite from the low-temperature end, the magnetic field supplier includes a first permanent magnet arranged in the first unit, the first permanent magnet switching the external magnetic field between the applying and the removal for the first part of the magneto-caloric element by rotating, and a second permanent magnet arranged in the second unit, the second permanent magnet switching the external magnetic field between the applying and the removal for the second part of the magneto-caloric element by rotating, the pump discharges the heat transport medium to the high-temperature circulation passage from the high-temperature end when the heat transport medium flows from the middle low-temperature end to the high-temperature end in the first unit, the pump draws the heat transport medium from the high-temperature circulation passage to the high-temperature end when the heat transport medium flows from the high-temperature end to the middle low-temperature end in the first unit, the pump discharges the heat transport medium to the low-temperature circulation passage from the low-temperature end when the heat transport medium flows from the middle high-temperature end to the low-temperature end in the second unit, and the pump draws the heat transport medium from the low-temperature circulation passage to the low-temperature end when the heat transport medium flows from the low-temperature end to the middle high-temperature end in the second unit.

9. The thermo-magnetic cycle apparatus according to claim 1, wherein the drive unit defines a chamber, the temperature detector being disposed within the chamber.

10. The thermo-magnetic cycle apparatus according to claim 9, wherein the temperature detector is a thermostat wax disposed within the chamber.

11. The thermo-magnetic cycle apparatus according to claim 1, wherein the drive unit is attached directly to an outer surface of the magneto-caloric element.

12. The thermo-magnetic cycle apparatus according to claim 1, wherein the bypass passage extends from the clearance outward in a radial direction.

13. The thermo-magnetic cycle apparatus according to claim 1, wherein a length of the bypass passage is shorter than a length of the predetermined part in a flowing direction of the heat transport medium.

14. The thermo-magnetic cycle apparatus according to claim 1, wherein a first pressure loss is generated when the valve device is closed and a second pressure loss is generated when the valve device is opened.

15. The thermo-magnetic cycle apparatus according to claim 14, wherein the second pressure loss is smaller than the first pressure loss.

16. The thermo-magnetic cycle apparatus according to claim 1, wherein a cross-sectional area of the bypass passage is restricted from being reduced.

* * * * *